(12) United States Patent
Matsuyama et al.

(10) Patent No.: US 9,708,486 B2
(45) Date of Patent: *Jul. 18, 2017

(54) HIGHLY BRANCHED LIPOPHILIC POLYMER, AND PHOTOPOLYMERIZABLE COMPOSITION CONTAINING THE SAME

(71) Applicant: NISSAN CHEMICAL INDUSTRIES, LTD., Tokyo (JP)

(72) Inventors: Motonobu Matsuyama, Funabashi (JP); Masayuki Haraguchi, Funabashi (JP); Masaaki Ozawa, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/955,803

(22) Filed: Dec. 1, 2015

(65) Prior Publication Data

US 2016/0083496 A1    Mar. 24, 2016

Related U.S. Application Data

(62) Division of application No. 14/005,633, filed as application No. PCT/JP2012/056880 on Mar. 16, 2012.

(30) Foreign Application Priority Data

Mar. 18, 2011    (JP) .................................. 2011-060586

(51) Int. Cl.
| | | |
|---|---|---|
| *C08F 2/46* | (2006.01) | |
| *C08F 2/50* | (2006.01) | |
| *C08G 61/04* | (2006.01) | |
| *C08L 33/10* | (2006.01) | |
| *C08F 4/04* | (2006.01) | |
| *C08F 220/18* | (2006.01) | |
| *C08F 22/10* | (2006.01) | |
| *C09D 133/06* | (2006.01) | |
| *C08F 257/00* | (2006.01) | |
| *C08F 265/06* | (2006.01) | |
| *C08F 267/06* | (2006.01) | |
| *C08F 222/10* | (2006.01) | |
| *C08F 230/08* | (2006.01) | |

(52) U.S. Cl.
CPC ............... *C08L 33/10* (2013.01); *C08F 2/50* (2013.01); *C08F 4/04* (2013.01); *C08F 22/10* (2013.01); *C08F 220/18* (2013.01); *C08F 257/00* (2013.01); *C08F 265/06* (2013.01); *C08F 267/06* (2013.01); *C09D 133/06* (2013.01); *C08F 222/1006* (2013.01); *C08F 230/08* (2013.01); *C08F 2220/1833* (2013.01)

(58) Field of Classification Search
CPC .. C08L 33/10; C08F 22/10; C08F 2/50; C08F 220/18; C08F 222/1006; C08F 230/08; C08F 4/04; C08F 2220/1833; C09D 133/06

USPC ......... 522/39, 33, 6, 71, 1, 189, 184; 520/1; 526/218.1, 217, 89, 199, 211, 210, 213, 526/219; 524/559, 556, 543, 1, 572, 571, 524/570

See application file for complete search history.

(56) References Cited

U.S. PATENT DOCUMENTS

| | | | | |
|---|---|---|---|---|
| 6,391,973 | B1 * | 5/2002 | Law ...................... | C08F 265/06 427/407.1 |
| 2004/0192804 | A1 * | 9/2004 | Kura .................. | C07D 295/112 522/65 |
| 2005/0250921 | A1 | 11/2005 | Qiu et al. | |
| 2007/0032615 | A1 | 2/2007 | Sato | |
| 2009/0053153 | A1 | 2/2009 | Lee et al. | |
| 2012/0135206 | A1 * | 5/2012 | Haraguchi ................ | C08F 2/48 428/195.1 |
| 2015/0299500 | A1 * | 10/2015 | Haraguchi ................ | C08F 2/44 428/335 |

FOREIGN PATENT DOCUMENTS

| | | | |
|---|---|---|---|
| JP | 2008-291138 A | | 12/2008 |
| JP | 2009-249584 A | | 10/2009 |
| JP | 2010-024330 | * | 2/2010 |

(Continued)

OTHER PUBLICATIONS

Hirano et al, JP 2010-024330 Machine Translation Feb. 2010.*
Dec. 19, 2014 Extended European Search Report issued in European Patent Application No. 12 760 631.7.
International Search Report issued in International Patent Application No. PCT/JP2012/056880 dated Apr. 17, 2012.
Written Opinion issued in International Patent Application No. PCT/JP2012/056880 dated Apr. 17, 2012.

*Primary Examiner* — Jessica E Whiteley
(74) *Attorney, Agent, or Firm* — Oliff PLC

(57) ABSTRACT

There is provided a highly branched lipophilic polymer that is excellent in blending and dispersing properties in a matrix resin, and is possible to provide surface modification properties such as excellent lipophilicity (anti-fingerprint property) and the like to a coating that is obtained from the resin composition while the intrinsic transparency of the resin is not impaired; and a photopolymeizable composition comprising the highly branched lipophilic polymer. A highly branched lipophilic polymer obtained by polymerizing a monomer A containing two or more radically polymerizable double bonds per molecule and a monomer B containing a $C_{6-30}$ alkyl group or a $C_{3-30}$ alicyclic group and at least one radically polymerizable double bond per molecule in the presence of 5 to 200 mol % of a polymerization initiator C relative to the number of moles of the monomer A. A photopolymeizable composition comprising the highly branched lipophilic polymer.

18 Claims, 10 Drawing Sheets

(56) References Cited

FOREIGN PATENT DOCUMENTS

| JP | 2010-024330 A | 2/2010 |
|----|---------------|--------|
| JP | 2010-024336 A | 2/2010 |
| JP | 2011-004865 A | 1/2011 |
| WO | 2009/148029 A1 | 12/2009 |
| WO | 2010/137724 A1 | 12/2010 |
| WO | 2011/004865 A1 | 1/2011 |

* cited by examiner

FIG. 9
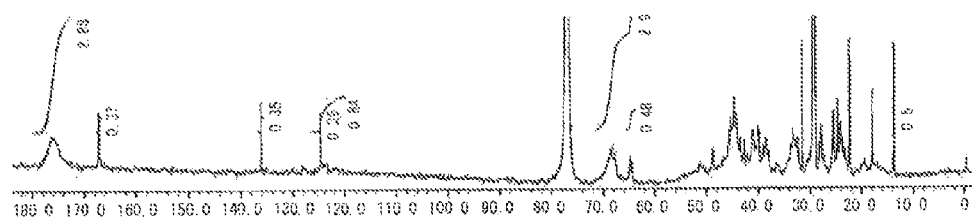
FIG. 10
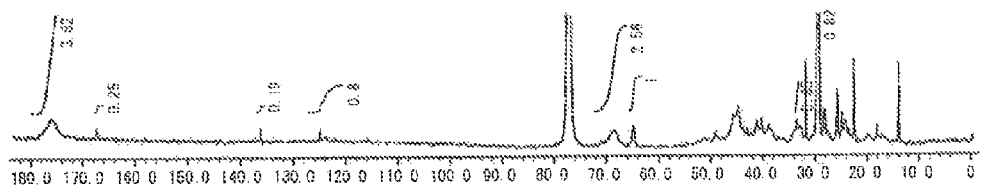
FIG. 11
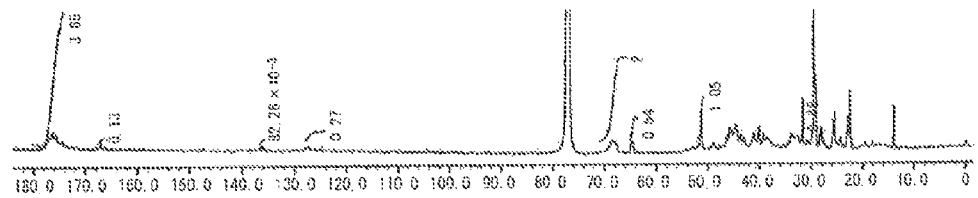
FIG. 12

HIGHLY BRANCHED LIPOPHILIC POLYMER, AND PHOTOPOLYMERIZABLE COMPOSITION CONTAINING THE SAME

This application is a divisional application of U.S. patent application Ser. No. 14/005,633, filed Nov. 29, 2013, which in turn is the U.S. national phase of international application no. PCT/JP2012/056880, filed Mar. 16, 2012. The entire disclosures of these applications are incorporated herein by reference.

TECHNICAL FIELD

The present invention relates to a highly branched lipophilic polymer. More specifically, the present invention relates to a highly branched polymer that contains a long-chain alkyl group or an alicyclic group and that is usable as a surface modifier for a resin, and a photopolymerizable composition containing the same.

BACKGROUND ART

Polymer (macromolecular) materials are increasingly utilized in many fields in recent years. Along with this, the surface and interface properties thereof as well as the features of the polymer as a matrix become important in each field. For example, properties thereof related to interface control, such as water repellency, oil repellency, anti-fouling property, non-stickiness, separation properties, mold release properties, smoothness, wear resistance, anti-reflective properties, and chemical resistance, are expected to be improved by using a fluorine compound with low surface free energy as a surface modifier, which therefore has been proposed in various kinds.

Fluoropolymers are widely used in the upper-most layer of various plastic films on the surface of displays such as LCDs (liquid crystal displays), PDPs (plasma displays), and touch panels so as to provide an anti-scratch hard coating. These fluoropolymers are being introduced as a material for preventing fingerprints and smudges from adhering and for easily removing adhered fingerprints and smudges.

However, conventional materials have disadvantages when used in applications such as mobile phones that directly touch facial sebum and in applications such as touch panels that fingers touch frequently; fingerprints and smudges still tend to adhere, and fingerprints and smudges such as sebum are repelled due to the water repellency and oil repellency, so that they become more visible. Besides, rubbing the display surface with a cloth or tissue paper so as to remove fingerprints and sebum smudges makes the fingerprints and sebum smudges into fine liquid drops to cause diffuse reflection of light, which makes the surface look cloudy, leaving the adherents even more visible than they had been prior to wiping.

Another research has been conducted on coating agents that include a lipophilic polymer in order to spread fingerprints and smudges of sebum components so as to make them less visible. For example, Patent Document 1 discloses a graft polymer synthesized by a reaction of an aliphatic acrylic monomer.

PRIOR ART DOCUMENTS

Patent Documents

Patent Document 1: Japanese Patent Application Publication No. 2009-249584 (JP 2009-249584 A)

SUMMARY OF THE INVENTION

Problem to be Solved by the Invention

Although various researches have been conducted on a lipophilic material as mentioned above, the contact angle of the material with oleic acid that predominantly composes sebum is about 10 degrees, which is inadequate for an anti-fingerprint property. Therefore, improved lipophilic materials have been desired.

A long-chain aliphatic acrylic monomer used in the material described in Patent Document 1 is highly crystalline. Therefore, a linear polymer resulted from the monomer is poorly soluble in an organic solvent, so application thereof to procedures that include film formation with an organic solvent is difficult.

Thus, a compound that is highly soluble in an organic solvent, that presents adequate transparency when added to a matrix polymer, and that has a surface modifying effect to give high lipophilicity (anti-fingerprint property) has been demanded.

Means for Solving the Problem

The inventors of the present invention have conducted intensive research to achieve the object and, as a result, found that a highly branched lipophilic polymer obtained by introducing a long-chain alkyl group or an alicyclic group into a highly branched polymer is, when used as a surface modifier for a resin, highly soluble in an organic solvent, blends and disperses well in a matrix resin to form no aggregate in the matrix resin, and provides a coating with high transparency and excellent surface modification properties. Thus, the present invention has now been completed.

That is, according to a first aspect, the present invention relates to a highly branched lipophilic polymer obtained by polymerizing a monomer A containing two or more radically polymerizable double bonds per molecule and a monomer B containing a $C_{6-30}$ alkyl group or a $C_{3-30}$ alicyclic group and at least one radically polymerizable double bond per molecule in the presence of 5 to 200 mol % of a polymerization initiator C relative to the number of moles of the monomer A.

According to a second aspect, the present invention relates to the highly branched lipophilic polymer according to the first aspect, in which the monomer A is a compound containing either or both of a vinyl group and a (meth)acrylic group.

According to a third aspect, the present invention relates to the highly branched lipophilic polymer according to the second aspect, in which the monomer A is a divinyl compound or a di(meth)acrylate compound.

According to a fourth aspect, the present invention relates to the highly branched lipophilic polymer according to the third aspect, in which the monomer A is a compound containing a $C_{3-30}$ alicyclic group.

According to a fifth aspect, the present invention relates to the highly branched lipophilic polymer according to the fourth aspect, in which the monomer A is tricyclo[$5.2.1.0^{2,6}$]decanedimethanol di(meth)acrylate.

According to a sixth aspect, the present invention relates to the highly branched lipophilic polymer according to the third aspect, in which the monomer A is a compound of Formula [1]:

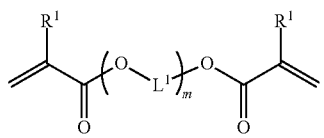

(where $R^1$ is a hydrogen atom or a methyl group; $L^1$ is a $C_{2-12}$ alkylene group that is optionally substituted with a hydroxy group; and m is an integer of 1 to 30).

According to a seventh aspect, the present invention relates to the highly branched lipophilic polymer according to the sixth aspect, in which $L^1$ is an ethylene group.

According to an eighth aspect, the present invention relates to the highly branched lipophilic polymer according to the first aspect, in which the highly branched lipophilic polymer is obtained using 5 to 300 mol % of the monomer B relative to the number of moles of the monomer A.

According to a ninth aspect, the present invention relates to the highly branched lipophilic polymer according to the eighth aspect, in which the monomer B is a compound of Formula [2]:

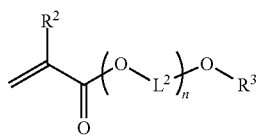

(where $R^2$ is a hydrogen atom or a methyl group; $R^3$ is a $C_{6-30}$ alkyl group or a $C_{3-30}$ alicyclic group; $L^2$ is a $C_{2-6}$ alkylene group; and n is an integer of 0 to 30).

According to a tenth aspect, the present invention relates to the highly branched lipophilic polymer according to the ninth aspect, in which n is 0.

According to an eleventh aspect, the present invention relates to the highly branched lipophilic polymer according to the ninth aspect, in which $L^2$ is an ethylene group.

According to a twelfth aspect, the present invention relates to the highly branched lipophilic polymer according to any one of the first aspect to the eleventh aspect, in which the polymerization initiator C is an azo polymerization initiator.

According to a thirteenth aspect, the present invention relates to the highly branched lipophilic polymer according to the twelfth aspect, in which the polymerization initiator C is 2,2'-azobis(2,4-dimethylvaleronitrile).

According to a fourteenth aspect, the present invention relates to the highly branched lipophilic polymer according to the twelfth aspect, in which the polymerization initiator C is dimethyl 1,1'-azobis(1-cyclohexanecarboxylate).

According to a fifteenth aspect, the present invention relates to a varnish comprising the highly branched lipophilic polymer as described in any one of the first aspect to the fourteenth aspect.

According to a sixteenth aspect, the present invention relates to a thin film comprising the highly branched lipophilic polymer as described in any one of the first aspect to the fourteenth aspect.

According to a seventeenth aspect, the present invention relates to a photopolymerizable composition comprising the highly branched lipophilic polymer (a) as described in any one of the first aspect to the fourteenth aspect, a photopolymerizable compound (b), and a photopolymerization initiator (c).

According to an eighteenth aspect, the present invention relates to the photopolymerizable composition according to the seventeenth aspect, in which a content of the highly branched lipophilic polymer (a) is 0.01 to 20 parts by mass relative to 100 parts by mass of the photopolymerizable compound (b).

According to a nineteenth aspect, the present invention relates to the photopolymerizable composition according to the eighteenth aspect, in which the photopolymerizable compound (b) is a multifunctional (meth)acrylate compound.

According to a twentieth aspect, the present invention relates to the photopolymerizable composition according to the nineteenth aspect, in which the photopolymerizable compound (b) is dipentaerythritol hexa(meth)acrylate.

According to a twenty-first aspect, the present invention relates to a resin shaped product prepared by photopolymerization of the photopolymerizable composition as described in any one of the seventeenth aspect to the twentieth aspect.

According to a twenty-second aspect, the present invention relates to a method for producing a highly branched lipophilic polymer, characterized by comprising polymerizing a monomer A containing two or more radically polymerizable double bonds per molecule and a monomer B containing a $C_{6-30}$ alkyl group or a $C_{3-30}$ alicyclic group and at least one radically polymerizable double bond per molecule in the presence of 5 to 200 mol % of a polymerization initiator C relative to the number of moles of the monomer A.

Effects of the Invention

The highly branched lipophilic polymer of the present invention has a branched structure that is intentionally added, so there is less molecular entanglement compared to a linear polymer and the highly branched lipophilic polymer behaves as a fine particle and disperses well in an organic solvent and a resin. Because of this, when added as a surface modifier to a resin, the highly branched lipophilic polymer of the present invention would not readily aggregate in a matrix resin, and also easily moves to the surface, which provides surface modification properties to the surface of the resin. Thus, by adding a highly branched lipophilic polymer to a resin composition, it is possible to provide surface modification properties such as excellent lipophilicity (anti-fingerprint property) and the like to a coating that is obtained from the resin composition while the intrinsic transparency of the resin is not impaired.

BRIEF DESCRIPTION OF THE DRAWINGS

FIG. 9 indicates a $^{13}$C NMR spectrum of a highly branched polymer 9 produced in Example 9.
FIG. 10 indicates a $^{13}$C NMR spectrum of a highly branched polymer 10 produced in Example 10.
FIG. 11 indicates a $^{13}$C NMR spectrum of a highly branched polymer 11 produced in Example 11.
FIG. 12 indicates a $^{13}$C NMR spectrum of a highly branched polymer 12 produced in Example 12.

MODES FOR CARRYING OUT THE INVENTION

Highly Branched Lipophilic Polymer

Figure 1:
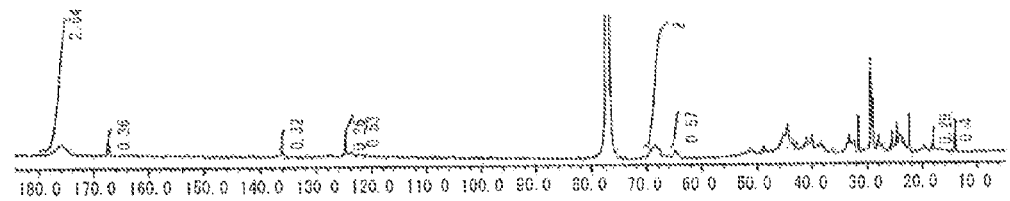
FIG. 1 indicates a $^{13}C$ NMR spectrum of a highly branched polymer 1 produced in Example 1.

A highly branched lipophilic polymer of the present invention can be obtained by polymerizing a monomer A containing two or more radically polymerizable double bonds per molecule and a monomer B containing a $C_{6-30}$ alkyl group or a $C_{3-30}$ alicyclic group and at least one radically polymerizable double bond per molecule in the presence of 5 to 200 mol % of a polymerization initiator C relative to the number of moles of the monomer A. The highly branched polymer is a so-called initiator-fragment incorporation type highly branched polymer, and the terminal thereof has a fragment of the polymerization initiator C used in polymerization.

The highly branched lipophilic polymer of the present invention may also include, where appropriate, another monomer different from the monomer A or the monomer B by copolymerization, as long as the highly branched lipophilic polymer does not impair the effects of the present invention.

[Monomer A]

In the present invention, the monomer A containing two or more radically polymerizable double bonds per molecule preferably contains either or both of a vinyl group and a (meth)acrylic group, is particularly preferably a divinyl compound or a di(meth)acrylate compound, and is particularly preferably a compound of Formula [1]:

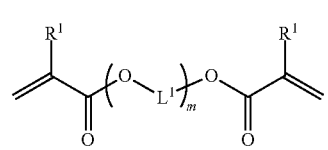

[1]

(where $R^1$ is a hydrogen atom or a methyl group; $L^1$ is a $C_{2-12}$ alkylene group that is optionally substituted with a hydroxy group; and m is an integer of 1 to 30).

Examples of the $C_{2-12}$ alkylene group represented as $L^1$ that is optionally substituted with a hydroxy group include an ethylene group, a trimethylene group, a 2-hydroxytrimethylene group, a methylethylene group, a tetramethylene group, a 1-methyltrimethylene group, a pentamethylene group, a 2,2-dimethyltrimethylene group, a hexamethylene group, a nonamethylene group, a 2-methyloctamethylene group, a decamethylene group, and a dodecamethylene group.

Among these, an ethylene group is preferable from the viewpoint of a surface modifying effect.

The monomer A is preferably a compound containing a $C_{3-30}$ alicyclic group.

In the present invention, a (meth)acrylate compound refers to either an acrylate compound or a methacrylate compound. For example, a (meth)acrylic acid refers to either acrylic acid or methacrylic acid.

Examples of the monomer A include organic compounds (A1) to (A4) below:
(A1) vinyl hydrocarbons:
(A1-1) aliphatic vinyl hydrocarbons; isoprene, butadiene, 3-methyl-1,2-butadiene, 2,3-dimethyl-1,3-butadiene, 1,2-polybutadiene, pentadiene, hexadiene, octadiene, and the like,
(A1-2) alicyclic vinyl hydrocarbons; cyclopentadiene, cyclohexadiene, cyclooctadiene, norbornadiene, and the like,
(A1-3) aromatic vinyl hydrocarbons; divinylbenzene, divinyltoluene, divinylxylene, trivinylbenzene, divinylbiphenyl, divinylnaphthalene, divinylfluorene, divinylcarbazole, divinylpyridine, and the like, (A2) vinyl esters, allyl esters, vinyl ethers, allyl ethers, and vinyl ketones:
(A2-1) vinyl esters; divinyl adipate, divinyl maleate, divinyl phthalate, divinyl isophthalate, divinyl itaconate, vinyl (meth)acrylate, and the like,
(A2-2) allyl esters; diallyl maleate, diallyl phthalate, diallyl isophthalate, diallyl adipate, allyl (meth)acrylate, and the like,
(A2-3) vinyl ethers; divinyl ether, diethylene glycol divinyl ether, triethylene glycol divinyl ether, and the like,
(A2-4) allyl ethers; diallyl ether, diallyloxyethane, triallyloxyethane, tetraallyloxyethane, tetraallyloxypropane, tetraallyloxybutane, tetramethallyloxyethane, and the like,
(A2-5) vinyl ketones; divinyl ketone, diallyl ketone, and the like,
(A3) (meth)acrylic acid esters:
(A3-1) aliphatic (meth)acrylic acid esters; ethylene glycol di(meth)acrylate, trimethylene glycol di(meth)acrylate, 2-hydroxy-1,3-di(meth)acryloyloxypropane, 2-hydroxy-1-acryloyloxy-3-methacryloyloxypropane, glycerol tri(meth)acrylate, propylene glycol di(meth)acrylate, tetramethylene glycol di(meth)acrylate, neopentyl glycol di(meth)acrylate, 1,6-hexanediol di(meth)acrylate, 1,9-nonanediol di(meth)acrylate, 2-methyl-1,8-octanediol di(meth)acrylate, 1,10-decanediol di(meth)acrylate, trimethylolpropane tri(meth)acrylate, ditrimethylolpropane tetra(meth)acrylate, pentaerythritol tetra(meth)acrylate, dipentaerythritol hexa(meth)acrylate, and the like,
(A3-2) alicyclic group-containing (meth)acrylic acid esters; 1,4-cyclohexanedimethanol di(meth)acrylate, (2-(1-((meth)acryloyloxy)-2-methylpropan-2-yl)-5-ethyl-1,3-dioxan-5-yl)methyl (meth)acrylate, 1,3-adamantanediol di(meth)acrylate, 1,3-adamantanedimethanol di(meth)acrylate, tricyclo[5.2.1.0$^{2,6}$]decanedimethanol di(meth)acrylate, and the like, (A3-3) aromatic (meth)acrylic acid esters;
ethoxylated bisphenol A (meth)acrylate, bis[4-(meth)acryloylthiophenyl]sulfide, 9,9-bis[4-(2-(meth)acryloyloxyethoxy)phenyl]fluorene, and the like,
(A3-4) poly(alkylene glycol) chain-containing (meth)acrylic acid esters; polyethylene glycol di(meth)acrylate (the number of ethylene glycol units: 2, 3, 4, 5, 6, 7, 8, 9, 10, 11, 12, 13, 14, and the like), bis[2-(meth)acryloylthioethyl]sulfide, polypropylene glycol di(meth)acrylate (the number of propylene glycol units: 2, 3, 4, 5, 6, 7, 8, 9, 10, 11, 12, 13, 14, and the like), poly(tetramethylene glycol) di(meth)acrylate (the number of tetramethylene glycol units: 2, 3, 4, 5, 6, 7, 8, 9, and the like), and the like, and
(A4) nitrogen-containing vinyl compounds:
diallylamine, diallyl isocyanurate, diallyl cyanurate, methylenebis(meth)acrylamide, bismaleimide, and the like.

Preferable among these are (A1-3) aromatic vinyl hydrocarbons, (A2) vinyl esters, allyl esters, vinyl ethers, allyl ethers, and vinyl ketones, (A3) (meth)acrylic acid esters, and (A4) nitrogen-containing vinyl compounds.

Particularly preferable are divinylbenzene in (A1-3), diallyl phthalate in (A2-2), ethylene glycol di(meth)acrylate, 2-hydroxy-1,3-di(meth)acryloyloxypropane, neopentyl glycol di(meth)acrylate, and 1,6-hexanediol di(meth)acrylate in (A3-1), 1,4-cyclohexanedimethanol di(meth)acrylate, 1,3-adamantanedimethanol di(meth)acrylate, and tricyclo[5.2.1.0$^{2,6}$]decanedimethanol di(meth)acrylate in (A3-2), nonaethylene glycol di(meth)acrylate in (A3-4), and methylenebis(meth)acrylamide in (A4). Among these, divinylbenzene, ethylene glycol di(meth)acrylate, 2-hydroxy-1,3-di(meth)acryloyloxypropane, 1,6-hexanediol di(meth)acrylate, 1,4-cyclohexanedimethanol di(meth)acrylate, tricyclo[5.2.1.0$^{2,6}$]decanedimethanol di(meth)acrylate, and nonaethylene glycol di(meth)acrylate are preferable, and tricyclo[5.2.1.0$^{2,6}$]decanedimethanol di(meth)acrylate is more preferable.

[Monomer B]

In the present invention, the monomer B containing a $C_{6-30}$ alkyl group or a $C_{3-30}$ alicyclic group and at least one radically polymerizable double bond per molecule preferably contains either at least one vinyl group or at least one (meth)acrylic group, and is particularly preferably a compound of Formula [2]:

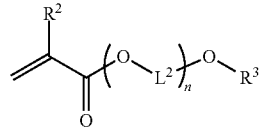

[2]

(where $R^2$ is a hydrogen atom or a methyl group; $R^3$ is a $C_{6-30}$ alkyl group or a $C_{3-30}$ alicyclic group; $L^2$ is a $C_{2-6}$ alkylene group; and n is an integer of 0 to 30).

Examples of the $C_{6-30}$ alkyl group represented as $R^3$ include a hexyl group, an ethylhexyl group, a 3,5,5-trimethylhexyl group, a heptyl group, an octyl group, a 2-octyl group, an isooctyl group, a nonyl group, a decyl group, an isodecyl group, an undecyl group, a lauryl group, a tridecyl group, a myristyl group, a palmityl group, a stearyl group, an isostearyl group, an arachyl group, a behenyl group, a lignoceryl group, a cerotoyl group, a montanyl group, and a melissyl group.

Among these, the number of carbon atoms in the alkyl group is preferably 10 to 30, and is more preferably 12 to 24, from the viewpoint of a surface modifying effect. Regardless of the alkyl group represented as $R^3$ being linear or branched, it is possible to provide surface modification properties such as excellent lipophilicity (anti-fingerprint property) and the like to a coating that is obtained from a resin composition that includes the highly branched lipophilic polymer of the present invention while the intrinsic transparency of the resin is not impaired. In order to give superior lipophilicity (anti-fingerprint property) to the coating, $R^3$ is preferably a linear alkyl group.

Examples of the $C_{3-30}$ alicyclic group represented as $R^3$ include a cyclopropyl group, a cyclobutyl group, a cyclopentyl group, a cyclohexyl group, a 4-tert-butylcyclohexyl group, an isobornyl group, a norbornenyl group, a mensil group, an adamantyl group, and a tricyclo[5.2.1.0$^{2,6}$]decanyl group.

Among these, a $C_{3-14}$ alicyclic group is preferable and a $C_{6-12}$ alicyclic group is more preferable from the viewpoint of a surface modifying effect.

Examples of the $C_{2-6}$ alkylene group represented as $L^2$ include an ethylene group, a trimethylene group, a methylethylene group, a tetramethylene group, a 1-methyltrimethylene group, a pentamethylene group, a 2,2-dimethyltrimethylene group, and a hexamethylene group.

Among these, an ethylene group is preferable from the viewpoint of a surface modifying effect.

n is preferably 0 from the viewpoint of a surface modifying effect.

Examples of the monomer B include hexyl (meth)acrylate, ethylhexyl (meth)acrylate, 3,5,5-trimethylhexyl (meth)acrylate, heptyl (meth)acrylate, octyl (meth)acrylate, 2-octyl (meth)acrylate, isooctyl (meth)acrylate, nonyl (meth)acrylate, decyl (meth)acrylate, isodecyl (meth)acrylate, undecyl (meth)acrylate, lauryl (meth)acrylate, tridecyl (meth)acrylate, palmityl (meth)acrylate, stearyl (meth)acrylate, isostearyl (meth)acrylate, behenyl (meth)acrylate, cyclopropyl (meth)acrylate, cyclobutyl (meth)acrylate, cyclopentyl (meth)acrylate, cyclohexyl (meth)acrylate, 4-tert-butylcyclohexyl (meth)acrylate, isobornyl (meth)acrylate, norbornene (meth)acrylate, mensil (meth)acrylate, adamantane (meth)acrylate, tricyclo[5.2.1.0$^{2,6}$]decane (meth)acrylate, 2-hexyloxyethyl (meth)acrylate, 2-lauryloxyethyl (meth)acrylate, 2-stearyloxyethyl (meth)acrylate, 2-cyclohexyloxyethyl (meth)acrylate, trimethylene glycol monolauryl ether (meth)acrylate, tetramethylene glycol monolauryl ether (meth)acrylate, hexamethylene glycol monolauryl ether (meth)acrylate, diethylene glycol monostearyl ether (meth)acrylate, triethylene glycol monostearyl ether (meth)acrylate, tetraethylene glycol monolauryl ether (meth)acrylate, tetraethylene glycol monostearyl ether (meth)acrylate, and hexaethylene glycol monostearyl ether (meth)acrylate. These monomers B may be used singly or in combination of two or more of them.

As for the proportion between the monomer A and the monomer B in copolymerization in the present invention, the monomer B is preferably at 5 to 300 mol % and is more preferably at 10 to 150 mol % relative to the number of moles of the monomer A from the viewpoints of reactivity and a surface modifying effect.

[Other Monomers]

In the present invention, another monomer different from the monomer A or the monomer B is not particularly limited provided that it is a monomer containing one radically polymerizable double bond per molecule, and is preferably a vinyl compound or a (meth)acrylate compound.

Examples of the monomer include compounds (1) to (3) below:

(1) fluorine-containing monomers; 2-(trifluoromethyl)acrylic acid, 2,2,2-trifluoroethyl acrylate, 2,2,3,3-tetrafluoropropyl acrylate, 2,2,3,3,3-pentafluoropropyl (meth)acrylate, 1H-1-(trifluoromethyl)trifluoroethyl (meth)acrylate, 1H,1H,3H-hexafluorobutyl (meth)acrylate, 1H,1H, 5H-octafluoropentyl (meth)acrylate, 2-(perfluorobutyl)ethyl (meth)acrylate, 3-(perfluorobutyl)-2-hydroxypropyl (meth)acrylate, and the like, (2) silicon-containing monomers; 3-(triethoxysilyl)propyl (meth)acrylate, 3-(trimethoxysilyl)propyl (meth)acrylate, 3-(dimethoxy(methyl)silyl)propyl (meth)acrylate, trimethoxyvinylsilane, triethoxyvinylsilane, tris(2-methoxyethoxy)vinylsilane, dimethoxymethyl(vinyl)silane, 4-(trimethoxysilyl)styrene, and the like, and (3) alkylene glycol monomers; 2-methoxyethyl (meth)acrylate, polyethylene glycol monomethyl ether (meth)acrylate (the number of ethylene glycol units: 2, 3, 4, 5, 6, 7, 8, 9, 10, 11, 12, 13, 14, 15, 16, 17, 18, 19, 20, 21, 22, 23, and the like), polypropylene glycol monomethyl ether (meth)acrylate (the number of propylene glycol units: 2, 3, 4, 5, 6, 7, 8, 9, 10, 11, 12, 13, 14, 15, 16, 17, 18, 19, 20, 21, 22, 23, and the like), and the like.

[Polymerization Initiator C]

Preferably used as the polymerization initiator C of the present invention is an azo polymerization initiator. Examples of the azo polymerization initiator include compounds (1) to (5) below:

(1) azonitrile compounds; 2,2'-azobisisobutyronitrile, 2,2'-azobis(2-methylbutyronitrile), 2,2'-azobis(2,4-dimethylvaleronitrile), 1,1'-azobis(1-cyclohexanecarbonitrile), 2,2'-azobis(4-methoxy-2,4-dimethylvaleronitrile), 2-(carbamoylazo)isobutyronitrile, and the like, (2) azoamide compounds; 2,2'-azobis{2-methyl-N-[1,1-bis(hydroxymethyl)-2-hydroxyethyl]propionamide}, 2,2'-azobis {2-methyl-N-[2-(1-hydroxybutyl)]propionamide}, 2,2'-azobis[2-methyl-N-(2-hydroxyethyl)propionamide], 2,2'-azobis[N-(2-propenyl)-2-methylpropionamide], 2,2'-azobis(N-butyl-2-methylpropionamide), 2,2'-azobis(N-cyclohexyl-2-methylpropionamide), and the like, (3) cyclic azoamidine compounds; 2,2'-azobis[2-(2-imidazolin-2-yl)propane]dihydrochloride, 2,2'-azobis[2-(2-imidazolin-2-yl)propane]disulfate dihydrate, 2,2'-azobis[2-[1-(2-hydroxyethyl)-2-imidazolin-2-yl]propane] dihydrochloride, 2,2'-azobis[2-(2-imidazolin-2-yl) propane], 2,2'-azobis(1-imino-1-pyrrolidino-2-methylpropane) dihydrochloride, and the like, (4) azoamidine compounds; 2,2'-azobis(2-methylpropionamidine) dihydrochloride, 2,2'-azobis[N-(2-carboxyethyl)-2-methylpropionamidine]tetrahydrate, and the like, and (5) others; dimethyl 2,2'-azobisisobutyrate, 4,4'-azobis(4-cyanovaleric acid), 2,2'-azobis(2,4,4-trimethylpentane), 1,1'-azobis(1-acetoxy-1-phenylethane), dimethyl 1,1'-azobis(1-cyclohexanecarboxylate), 4,4'-azobis(4-cyanopentanoic acid), and the like.

Among these azo polymerization initiators, from the viewpoint of the surface energy of the resulting highly branched lipophilic polymer, one having an alkyl group or an alicyclic group is desirable, and 2,2'-azobis(2,4-dimethylvaleronitrile) and dimethyl 1,1'-azobis(1-cyclohexanecarboxylate) are particularly preferable.

The amount of the polymerization initiator C used is 5 to 200 mol %, is preferably 15 to 200 mol %, is more preferably 15 to 170 mol %, and is even more preferably 50 to 100 mol %, relative to the number of moles of the monomer A.

<Method for Producing Highly Branched Lipophilic Polymer>

The highly branched lipophilic polymer of the present invention is obtained by polymerizing the monomer A and the monomer B in the presence of a predetermined amount of the polymerization initiator C relative to the amount of the monomer A. Examples of a method of the polymerization include known methods such as solution polymerization, dispersion polymerization, precipitation polymerization, and bulk polymerization, and among these, solution polymerization or precipitation polymerization is preferable. Particularly, in terms of molecular weight control, the reaction is preferably performed by solution polymerization in an organic solvent.

Examples of this organic solvent include aromatic hydrocarbons such as benzene, toluene, xylene, ethylbenzene, and tetralin; aliphatic or alicyclic hydrocarbons such as n-hexane, n-heptane, mineral spirits, and cyclohexane; halides such as methyl chloride, methyl bromide, methyl iodide, methylene dichloride, chloroform, carbon tetrachloride, trichloroethylene, perchloroethylene, and o-dichlorobenzene; esters or ester ethers such as ethyl acetate, butyl acetate, methoxybutyl acetate, methyl cellosolve acetate, ethyl cellosolve acetate, and propylene glycol monomethyl ether acetate; ethers such as diethyl ether, tetrahydrofuran, 1,4-dioxane, methyl cellosolve, ethyl cellosolve, butyl cellosolve, and propylene glycol monomethyl ether; ketones such as acetone, ethyl methyl ketone, isobutyl methyl ketone, di-n-butyl ketone, and cyclohexanone; alcohols such as methanol, ethanol, n-propanol, isopropanol, n-butanol, isobutanol, tert-butanol, 2-ethylhexyl alcohol, and benzyl alcohol; amides such as N,N-dimethylformamide, N,N-dimethylacetamide, and N-methyl-2-pyrrolidone; sulfoxides such as dimethylsulfoxide, and mixed solvents of two or more of these.

Preferable among these are aromatic hydrocarbons, halides, esters, ester ethers, ethers, ketones, alcohols, amides, sulfoxides, and the like, and particularly preferable are toluene, xylene, o-dichlorobenzene, butyl acetate, propylene glycol monomethyl ether acetate, propylene glycol monomethyl ether, 1,4-dioxane, methyl cellosolve, isobutyl methyl ketone, N,N-dimethylformamide, N,N-dimethylacetamide, and the like.

In the case where the polymerization reaction is performed in the presence of an organic solvent, the content of the organic solvent in the whole polymerization reaction system is preferably 1 to 100 parts by mass and is further preferably 5 to 50 parts by mass relative to 1 part by mass of the monomer A.

The polymerization reaction is performed at normal pressure, under pressure with being hermetically sealed, or under reduced pressure, is preferably performed at normal pressure in order to ensure simplicity of the apparatus and the process to be used, and is also preferably performed in an atmosphere of an inert gas such as nitrogen.

The temperature during the polymerization reaction is preferably 50 to 200° C. and is further preferably 70 to 150° C. or 70 to 130° C. The polymerization reaction is more preferably performed at a temperature that is higher than the 10-hour half-life temperature of the polymerization initiator C by 20° C. or more. More specifically, the polymerization reaction is preferably performed by adding a solution containing the monomer A, the monomer B, the polymerization initiator C, and the organic solvent dropwise to the organic solvent that is maintained at a temperature that is higher than the 10-hour half-life temperature of the polymerization initiator C by 20° C. or more. The polymerization reaction is even more preferably performed at the reflux temperature of the organic solvent under a reaction pressure.

After the completion of the polymerization reaction, the resulting highly branched lipophilic polymer is recovered by a suitable method, followed by performing aftertreatment such as washing, where appropriate. Examples of a method of recovering the polymer from the reaction solution include methods such as reprecipitation.

The weight-average molecular weight (hereinafter, abbreviated as Mw) of the resulting highly branched lipophilic polymer measured by gel permeation chromatography (GPC) in terms of polystyrene is preferably 1,000 to 200,000, is more preferably 2,000 to 100,000, and is most preferably 5,000 to 60,000.

<Method for Producing Varnish and Thin Film>

A specific method for forming a thin film that includes the highly branched lipophilic polymer of the present invention is to dissolve or disperse the highly branched lipophilic polymer in a solvent to obtain a varnish (film-forming material), and then apply the varnish onto a base material by, for example, cast coating, spin coating, blade coating, dip coating, roll coating, bar coating, die coating, ink-jet printing, or a printing method (letterpress printing, intaglio printing, planography, screen printing, and the like) to obtain a coating. The resulting coating may be dried on a hot plate, in an oven, or the like, where appropriate, for film formation.

Preferable among these coating methods is spin coating. Spin coating is advantageous because the time required for coating is short enough to allow use of even a highly volatile solution and also because highly uniform coating can be achieved.

Examples of the base material include plastics (polycarbonate, polymethacrylate, polystyrene, polyester, polyolefin, epoxy, melamine, triacetylcellulose, ABS, AS, norbornene resins, and the like), metals, wood, paper, glass, and slate. The base material may be a plate, a film, or a three-dimensional molded article.

The solvent used to obtain the varnish only needs to dissolve the highly branched lipophilic polymer, and examples thereof include toluene, ethyl lactate, γ-butyrolactone, propylene glycol monomethyl ether acetate (PGMEA), tetrahydrofuran (THF), butyl cellosolve, diethylene glycol monoethyl ether, propylene glycol monomethyl ether (PGME), propylene glycol monoethyl ether, hexafluoropropyl hexafluoro-2-pentyl ether, acetone, cyclohexanone, and N,N-dimethylformamide (DMF). The solvent may be used alone or as a mixture of two or more of these.

The dissolving or dispersing of the highly branched lipophilic polymer in the solvent may be performed at any concentration, which, however, is 0.001 to 90% by mass, is preferably 0.002 to 80% by mass, and is more preferably 0.005 to 70% by mass relative to the total mass (the sum of the mass) of the highly branched lipophilic polymer and the solvent.

The thickness of the thin film formed from the highly branched lipophilic polymer is not particularly limited, and it is usually 0.01 to 50 μm and is preferably 0.05 to 20 μm.

Photopolymerizable Composition and Shaped Product Produced Therefrom

The present invention also relates to a photopolymerizable composition including the highly branched lipophilic polymer (a), a photopolymerizable compound (b), and a photopolymerization initiator (c).

[Photopolymerizable Compound (b)]

The photopolymerizable compound (b) is not particularly limited provided that it is a compound containing, per molecule, one or more, preferably 1 to 10 polymerizable moieties that are polymerized by the action of a photopolymerization initiator. The polymerizable compound in the present invention is a compound other than so-called polymer compounds, and includes dimers, trimers, oligomers, and reactive polymers as well as monomer compounds (monomers) in a narrow sense.

Examples of the polymerizable moieties include ethylenically unsaturated bonds that are radically polymerizable moieties. Therefore, examples of the photopolymerizable compound include compounds containing an ethylenically unsaturated bond that is a radically polymerizable moiety.

Preferable among these compounds is a multifunctional (meth)acrylate compound that contains two or more (meth)acrylic groups having an ethylenically unsaturated bond moiety.

Examples of the polymerizable compound include the (meth)acrylic acid esters (A3) mentioned as an example of the monomer A and multifunctional urethane acrylate compounds. Among these, tricyclo[5.2.1.0$^{2,6}$]decanedimethanol di(meth)acrylate, ethylene glycol di(meth)acrylate, trimethylolpropane tri(meth)acrylate, ditrimethylolpropane tetra(meth)acrylate, pentaerythritol tetra(meth)acrylate, dipentaerythritol hexa(meth)acrylate, 1,6-hexanediol di(meth)acrylate, dioxane glycol di(meth)acrylate, 9,9-bis[4-(2-(meth)acryloyloxyethoxy)phenyl]fluorene, ethoxylated bisphenol A (meth)acrylate, and the like are preferable, and tricyclo[5.2.1.0$^{2,6}$]decanedimethanol di(meth)acrylate is particularly desirable.

As for the blending ratio of the highly branched lipophilic polymer (a) and the photopolymerizable compound (b) in the photopolymerizable composition, the highly branched lipophilic polymer (a) is preferably at 0.01 to 20 parts by mass and more preferably at 0.1 to 20 parts by mass relative to 100 parts by mass of the photopolymerizable compound (b).

[Photopolymerization Initiator (c)]

The photopolymerization initiator (c) used can be a known one, and examples thereof include benzoins, benzophenones, benzyl ketals, α-hydroxyketones, α-aminoketones, acylphosphine oxides, thioxanthones, iodonium salts, and sulfonium salts. Specific, non-limiting examples thereof include IRGACURE (registered trademark) 127, 184, 369, 500, 651, 784, 907, 819, 1000, 1300, 1700, 1800, 1850, and 2959, and DAROCUR (registered trademark) 1173 and MBF [all of the above are manufactured by BASF], ADEKA OPTOMER CP-77 [manufactured by ADEKA CORPORATION], and ESACURE (registered trademark) 1720 [manufactured by Lamberti S.p.A.]. Such a photopolymerization initiator can also be used as a combination of a plurality of these.

In the photopolymerizable composition, the addition amount of the photopolymerization initiator (c) is preferably 0.1 to 20 parts by mass and is more preferably 0.5 to 10 parts by mass relative to 100 parts by mass of the photopolymerizable compound (b). Within this range, polymerization of the photopolymerizable compound (b) can be achieved without impairing transmittance.

[Other Additives]

In the photopolymerizable composition, a common additive such as a photosensitizer, a polymerization inhibitor, a polymerization initiator, a leveling agent, a surfactant, a tackifier, a plasticizer, an ultraviolet absorber, an antioxidant, a stabilizer, an antistatic agent, an inorganic filler, a pigment, and a dye may be added, where appropriate, without impairing the effects of the present invention.

[Method for Producing Photo-Cured Shaped Product]

The photopolymerizable composition of the present invention can be applied onto a base material for photopolymerization (curing) to obtain a shaped product such as a cured film and a laminate. Examples of the base material include plastics (polycarbonate, polymethacrylate, polystyrene, polyester, polyolefin, epoxy, melamine, triacetylcellulose, ABS, AS, norbornene resins, and the like), metals, wood, paper, glass, and slate. The base material may be a plate, a film, or a three-dimensional formed article.

As a method for applying the photopolymerizable composition of the present invention, the coating methods described in <Method for producing varnish and thin film> and the like can be used. The photopolymerizable composition is preferably filtrated through, for example, a filter having a pore size of about 0.2 μm before being applied.

After application, pre-drying is preferably performed on a hot plate, in an oven, or the like, and then irradiation of an active ray such as ultraviolet light is performed for photocuring. Examples of the active ray include ultraviolet light, an electron beam, and an X-ray. As a light source for ultraviolet radiation, sunlight, a chemical lamp, a low-pressure mercury lamp, a high-pressure mercury lamp, a metal halide lamp, a xenon lamp, and the like can be used. Polymerization can be completed by post-baking, specifically by heating on a hot plate, in an oven, or the like.

The thickness of the coated film is not particularly limited, and it is usually 0.01 to 50 μm and is preferably 0.05 to 20 μm after dried and cured.

EXAMPLES

The present invention will be described more specifically by examples. The scope of the present invention is, however, not limited to these examples.

The apparatuses and conditions used in preparation and physical property analysis of samples in the examples are as follows.

(1) Gel Permeation Chromatography (GPC)
Apparatus: HLC-8220 GPC manufactured by Tosoh Corporation
Column: Shodex (registered trademark) KF-804L and KF-805L manufactured by Showa Denko K.K.
Column temperature: 40° C.
Solvent: tetrahydrofuran
Detector: RI (2) $^{13}$C NMR Spectrum
Apparatus: JNM-ECA700 manufactured by JEOL Datum, Ltd.
Solvent: CDCl$_3$
Standard: CDCl$_3$ (77.0 ppm)

(3) Measurement of Glass Transition Temperature (Tg)
Apparatus: DSC204 F1 Phoenix (registered trademark) manufactured by NETZSCH Measurement condition: in a nitrogen atmosphere Temperature raising rate: 5° C./minute (25-160° C.)

(4) Measurement of 5% Weight Loss Temperature (Td$_{5\%}$)
Apparatus: TG8120 manufactured by Rigaku Corporation
Measurement condition: in an air atmosphere
Temperature raising rate: 10° C./minute (25-500° C.)

(5) Spin Coater
Apparatus: MS-A100 manufactured by MIKASA CO., LTD.

(6) Ellipsometry (Measurement of Refractive Index and Film Thickness)
Apparatus: EC-400 manufactured by J. A. Woollam (7) Measurement of Contact Angle
Apparatus: VCA Optima manufactured by AST Products, Inc.
Measurement temperature: 20° C.

(8) Haze Meter (Measurement of Total Light Transmittance and HAZE)
Apparatus: NDHSO00 manufactured by NIPPON DENSHOKU INDUSTRIES CO., LTD.

(9) UV Irradiator
Apparatus: H02-L41 manufactured by EYE GRAPHICS CO., LTD.

Abbreviations mean as follows.
DCP: tricyclo[5.2.1.0$^{2,6}$]decanedimethanol dimethacrylate [DCP manufactured by Shin Nakamura Chemical Co., Ltd.]
ADCP: tricyclo[5.2.1.0$^{2,6}$]decanedimethanol diacrylate [A-DCP manufactured by Shin Nakamura Chemical Co., Ltd.]
S164: both terminal methacryl-modified silicone oil [Shin-Etsu Silicone X-22-164 manufactured by Shin-Etsu Chemical Co., Ltd.]
CHA: 1,4-cyclohexanedimethanol diacrylate [CD406 manufactured by Sartomer Japan Inc.]
DMA: ethylene glycol dimethacrylate[1G manufactured by Shin Nakamura Chemical Co., Ltd.]
PG: 2-hydroxy-1,3-dimethacryloyloxypropane[701 manufactured by Shin Nakamura Chemical Co., Ltd.]
NPG: 2,2-dimethylpropane-1,3-diyl dimethacrylate [NPG manufactured by Shin Nakamura Chemical Co., Ltd.]
HDN: 1,6-hexanediol dimethacrylate [HD-N manufactured by Shin Nakamura Chemical Co., Ltd.]
AHDN: 1,6-hexanediol diacrylate [A-HD-N manufactured by Shin Nakamura Chemical Co., Ltd.]

9DMA: nonaethylene glycol dimethacrylate [BLEMMER PDE-400 manufactured by NOF CORPORATION]
DVB: divinylbenzene [DVB-960 manufactured by Nippon Steel Chemical Co., Ltd.]
LA: lauryl acrylate [LA manufactured by OSAKA ORGANIC CHEMICAL INDUSTRY LTD.]
STA: stearyl acrylate [STA manufactured by OSAKA ORGANIC CHEMICAL INDUSTRY LTD.]
ISTA: isostearyl acrylate [ISTA manufactured by OSAKA ORGANIC CHEMICAL INDUSTRY LTD.]
BA: behenyl acrylate [A-BH manufactured by Shin Nakamura Chemical Co., Ltd.]
4EOL: tetraethylene glycol monolauryl ether acrylate [BLEMMER ALE-200 manufactured by NOF CORPORATION]
TMSMA: 3-methacryloxypropyltrimethoxysilane [Shin-Etsu Silicone KBM-503 manufactured by Shin-Etsu Chemical Co., Ltd.]
TESMA: 3-methacryloxypropyltriethoxysilane [Shin-Etsu Silicone KBE-503 manufactured by Shin-Etsu Chemical Co., Ltd.]
4EO: tetraethylene glycol monomethyl ether methacrylate [BLEMMER PME-200 manufactured by NOF CORPORATION]
9EO: nonaethylene glycol monomethyl ether acrylate [BLEMMER AME-400 manufactured by NOF CORPORATION]
C1FA: 2,2,2-trifluoroethyl acrylate [Viscoat 3F manufactured by OSAKA ORGANIC CHEMICAL INDUSTRY LTD.]
ADVN: 2,2'-azobis(2,4-dimethylvaleronitrile) [V-65 manufactured by Wako Pure Chemical Industries, Ltd.]
DCHC: dimethyl 1,1'-azobis(1-cyclohexanecarboxylate) [VE-073 manufactured by Wako Pure Chemical Industries, Ltd.]
AMBN: 2,2'-azobis(2-methylbutyronitrile) [V-59 manufactured by Wako Pure Chemical Industries, Ltd.]
DPHA: dipentaerythritol hexaacrylate [KAYARAD DPHA manufactured by Nippon Kayaku Co., Ltd.]
BS575: hexafunctional urethane acrylate [BEAMSET 575 manufactured by ARAKAWA CHEMICAL INDUSTRIES, LTD.]
UA306H: hexafunctional urethane acrylate [UA-306H manufactured by Kyoeisha Chemical Co., Ltd.]
UA306I: hexafunctional urethane acrylate [UA-306I manufactured by Kyoeisha Chemical Co., Ltd.]
UA306T: hexafunctional urethane acrylate [UA-306T manufactured by Kyoeisha Chemical Co., Ltd.]
UV1700: multifunctional urethane acrylate [SHIKOH (registered trademark) UV-1700B manufactured by The Nippon Synthetic Chemical Industry Co., Ltd.]
UV6300: multifunctional urethane acrylate [SHIKOH (registered trademark) UV-6300B manufactured by The Nippon Synthetic Chemical Industry Co., Ltd.]
UV7600: multifunctional urethane acrylate [SHIKOH (registered trademark) UV-7600B manufactured by The Nippon Synthetic Chemical Industry Co., Ltd.]
UV7605: multifunctional urethane acrylate [SHIKOH (registered trademark) UV-7605B manufactured by The Nippon Synthetic Chemical Industry Co., Ltd.]
Irg. 907: 2-methyl-1-[4-(methylthio)phenyl]-2-molpholino-propan-1-one) [IRGACURE (registered trademark) 907 manufactured by BASF]
ZX: commercially available lipophilic surface modifier [ZX-058-A manufactured by T&K TOKA CO., LTD.]
THF: tetrahydrofuran
MIBK: 4-methyl-2-pentanone (isobutyl methyl ketone)
AcOBu: butyl acetate

[Example 1] Production of Highly Branched Polymer 1 with DCP, LA, and ADVN 53 g of toluene was placed in a 200-mL reaction flask, into which nitrogen was flowed for 5 minutes with stirring, followed by heating until reflux of the content (at about 110° C.).

In a 100-mL reaction flask, 6.6 g (20 mmol) of DCP as a monomer A, 2.4 g (10 mmol) of LA as a monomer B, 3.0 g (12 mmol) of ADVN as an initiator C, and 53 g of toluene were placed. Nitrogen was flowed thereinto for 5 minutes with stirring to perform replacement with nitrogen, followed by cooling to 0° C. in an ice bath.

The content of the 100-mL reaction flask containing DCP, LA, and ADVN was added dropwise to the refluxed toluene in the 200-mL reaction flask with a dropping pump over 30 minutes. After the completion of dropwise addition, stirring continued for another 1 hour.

About 80% (80 g) of the originally placed toluene was then distilled off from the reaction solution with a rotary evaporator, followed by adding the resultant to 330 g of a hexane/ethanol mixed solution (mass ratio of 1:2) to precipitate a polymer in a slurry state. The slurry was filtrated under reduced pressure, followed by vacuum drying to obtain 6.4 g of a desired product (highly branched polymer 1) as a white powder.

The weight-average molecular weight Mw of the obtained product measured by GPC in terms of polystyrene was 7,800, and the degree of distribution, Mw (weight-average molecular weight)/Mn (number-average molecular weight), of the product was 3.0. The $^{13}$C NMR spectrum of the product is shown in FIG. 1.

[Example 2] Production of Highly Branched Polymer 2 with DCP, LA, STA, and ADVN

Polymerization and purification were performed in the same manner as in Example 1 except that 3.2 g (10 mmol) of STA was further added as a monomer B, to obtain 6.6 g of a desired product (highly branched polymer 2) as a white powder.

Figure 2:
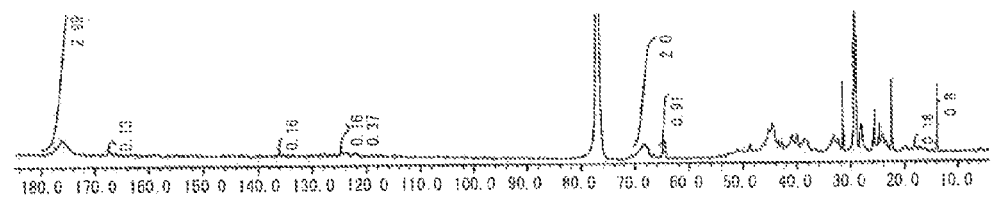
FIG. 2 indicates a $^{13}C$ NMR spectrum of a highly branched polymer 2 produced in Example 2.

The weight-average molecular weight Mw of the obtained product measured by GPC in terms of polystyrene was 13,000, and the degree of distribution, Mw/Mn, of the product was 2.4. The $^{13}$C NMR spectrum of the product is shown in FIG. 2.

[Example 3] Production of Highly Branched Polymer 3 with DCP, STA, and ADVN

Polymerization and purification were performed in the same manner as in Example 1 except that 3.2 g (10 mmol) of STA was used as a monomer B, to obtain 5.3 g of a desired product (highly branched polymer 3) as a white powder.

Figure 3:
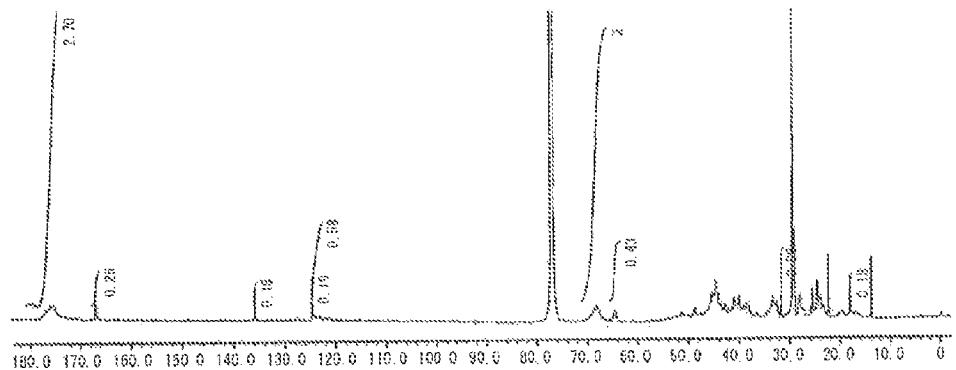
FIG. 3 indicates a $^{13}C$ NMR spectrum of a highly branched polymer 3 produced in Example 3.

The weight-average molecular weight Mw of the obtained product measured by GPC in terms of polystyrene was 10,000, and the degree of distribution, Mw/Mn, of the product was 2.1. The $^{13}$C NMR spectrum of the product is shown in FIG. 3.

[Example 4] Production of Highly Branched Polymer 4 with DCP, STA, and ADVN

Polymerization and purification were performed in the same manner as in Example 1 except that 6.5 g (20 mmol)

of STA was used as a monomer B and each amount of toluene was changed to 87 g, to obtain 5.1 g of a desired product (highly branched polymer 4) as a white powder.

Figure 4:
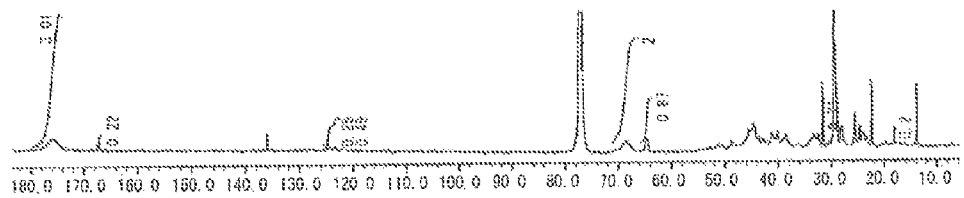
FIG. 4 indicates a $^{13}C$ NMR spectrum of a highly branched polymer 4 produced in Example 4.

The weight-average molecular weight Mw of the obtained product measured by GPC in terms of polystyrene was 8,200, and the degree of distribution, Mw/Mn, of the product was 2.6. The $^{13}$C NMR spectrum of the product is shown in FIG. 4.

[Example 5] Production of Highly Branched Polymer 5 with DCP, STA, TESMA, and ADVN Polymerization and purification were performed in the same manner as in Example 1 except that 3.2 g (10 mmol) of STA was used as a monomer B and 2.9 g (10 mmol) of TESMA was further added as another monomer, to obtain 5.1 g of a desired product (highly branched polymer 5) as a white powder.

Figure 5:
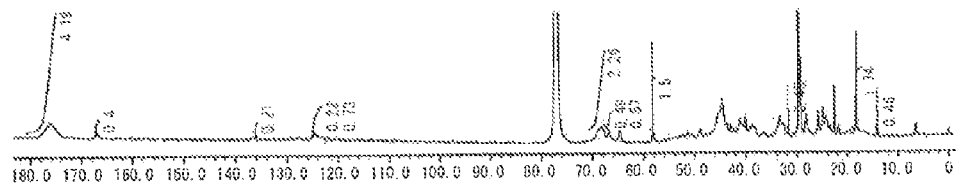
FIG. 5 indicates a $^{13}C$ NMR spectrum of a highly branched polymer 5 produced in Example 5.

The weight-average molecular weight Mw of the obtained product measured by GPC in terms of polystyrene was 11,000, and the degree of distribution, Mw/Mn, of the product was 2.0. The $^{13}$C NMR spectrum of the product is shown in FIG. 5.

[Example 6] Production of Highly Branched Polymer 6 with DCP, ISTA, and ADVN

Polymerization and purification were performed in the same manner as in Example 1 except that 3.2 g (10 mmol) of ISTA was used as a monomer B, to obtain 4.7 g of a desired product (highly branched polymer 6) as a white powder.

Figure 6:
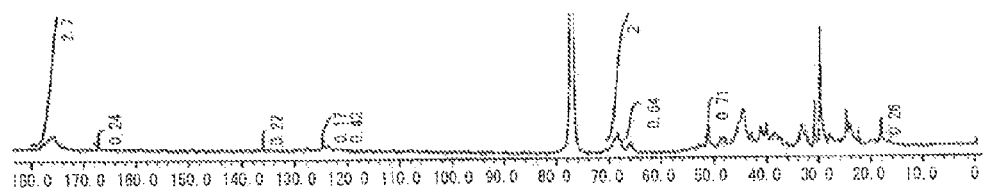
FIG. 6 indicates a $^{13}C$ NMR spectrum of a highly branched polymer 6 produced in Example 6.

The weight-average molecular weight Mw of the obtained product measured by GPC in terms of polystyrene was 11,000, and the degree of distribution, Mw/Mn, of the product was 2.0. The $^{13}$C NMR spectrum of the product is shown in FIG. 6.

[Example 7] Production of Highly Branched Polymer 7 with DCP, ISTA, TESMA, and ADVN Polymerization and purification were performed in the same manner as in Example 1 except that 3.2 g (10 mmol) of ISTA was used as a monomer B and 2.9 g (10 mmol) of TESMA was further added as another monomer, to obtain 4.5 g of a desired product (highly branched polymer 7) as a white powder.

Figure 7:
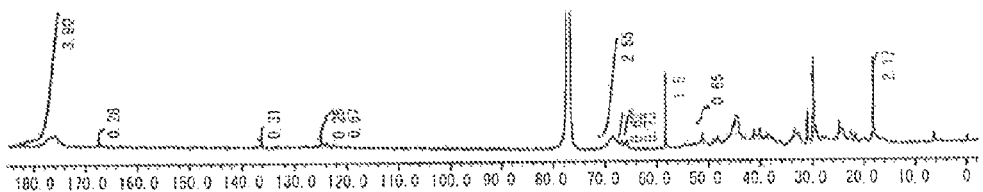
FIG. 7 indicates a $^{13}$C NMR spectrum of a highly branched polymer 7 produced in Example 7.

The weight-average molecular weight Mw of the obtained product measured by GPC in terms of polystyrene was 13,000, and the degree of distribution, Mw/Mn, of the product was 2.1. The $^{13}$C NMR spectrum thereof is shown in FIG. 7.

[Example 8] Production of Highly Branched Polymer 8 with DCP, BA, and ADVN

Polymerization and purification were performed in the same manner as in Example 1 except that 3.8 g (10 mmol) of BA was used as a monomer B, to obtain 5.0 g of a desired product (highly branched polymer 8) as a white powder.

Figure 8:
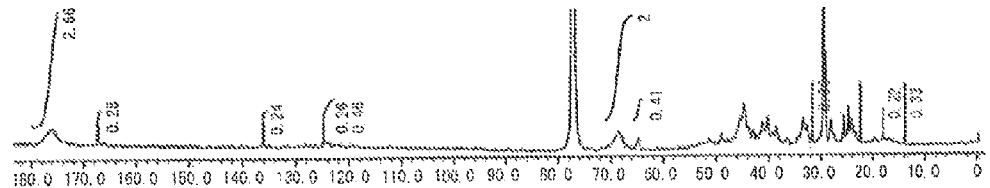
FIG. 8 indicates a $^{13}$C NMR spectrum of a highly branched polymer 8 produced in Example 8.

The weight-average molecular weight Mw of the obtained product measured by GPC in terms of polystyrene was 10,000, and the degree of distribution, Mw/Mn, of the product was 2.3. The $^{13}$C NMR spectrum of the product is shown in FIG. 8.

[Example 9] Production of Highly Branched Polymer 9 with DCP, BA, and ADVN

Polymerization and purification were performed in the same manner as in Example 1 except that 3.8 g (10 mmol) of BA was used as a monomer B and each amount of toluene was changed to 100 g, to obtain 4.1 g of a desired product (highly branched polymer 9) as a white powder.

The weight-average molecular weight Mw of the obtained product measured by GPC in terms of polystyrene was 6,600, and the degree of distribution, Mw/Mn, of the product was 2.1. The $^{13}$C NMR spectrum of the product is shown in FIG. 9.

[Example 10] Production of Highly Branched Polymer 10 with DCP, BA, and ADVN

Polymerization and purification were performed in the same manner as in Example 1 except that 7.6 g (20 mmol) of BA was used as a monomer B, to obtain 7.5 g of a desired product (highly branched polymer 10) as a white powder.

The weight-average molecular weight Mw of the obtained product measured by GPC in terms of polystyrene was 13,000, and the degree of distribution, Mw/Mn, of the product was 2.0. The $^{13}$C NMR spectrum of the product is shown in FIG. 10.

[Example 11] Production of Highly Branched Polymer 11 with DCP, STA, and DCHC

Polymerization and purification were performed in the same manner as in Example 1 except that 3.2 g (10 mmol) of STA as a monomer B and 3.7 g (12 mmol) of DCHC as an initiator C were used and each amount of toluene was changed to 100 g, to obtain 3.0 g of a desired product (highly branched polymer 11) as a white powder.

The weight-average molecular weight Mw of the obtained product measured by GPC in terms of polystyrene was 5,700, and the degree of distribution, Mw/Mn, of the product was 1.4. The $^{13}$C NMR spectrum of the product is shown in FIG. 11.

[Example 12] Production of Highly Branched Polymer 12 with DCP, BA, and DCHC

Polymerization and purification were performed in the same manner as in Example 1 except that 3.8 g (10 mmol) of BA as a monomer B and 3.7 g (12 mmol) of DCHC as an initiator C were used and each amount of toluene was changed to 80 g, to obtain 7.3 g of a desired product (highly branched polymer 12) as a white powder.

The weight-average molecular weight Mw of the obtained product measured by GPC in terms of polystyrene was 6,500, and the degree of distribution, Mw/Mn, of the product was 1.8. The $^{13}$C NMR spectrum of the product is shown in FIG. 12.

[Example 13] Production of Highly Branched Polymer 13 with DCP, BA, and DCHC

Polymerization and purification were performed in the same manner as in Example 1 except that 7.6 g (20 mmol) of BA as a monomer B and 3.7 g (12 mmol) of DCHC as an initiator C were used and each amount of toluene was changed to 80 g, to obtain 13.0 g of a desired product (highly branched polymer 13) as a white powder.

Figure 13:
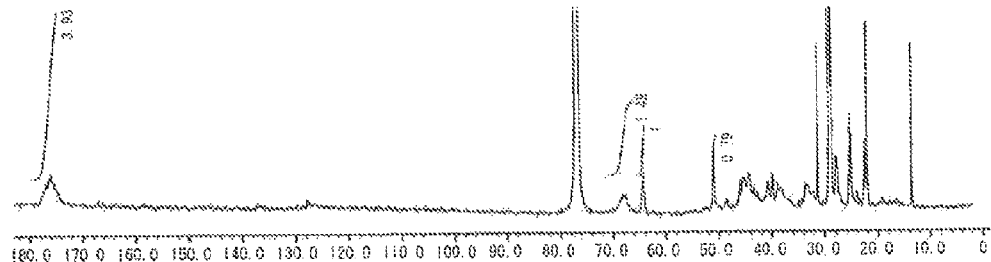
FIG. 13 indicates a $^{13}$C NMR spectrum of a highly branched polymer 13 produced in Example 13.

The weight-average molecular weight Mw of the obtained product measured by GPC in terms of polystyrene was 7,600, and the degree of distribution, Mw/Mn, of the product was 1.7. The $^{13}$C NMR spectrum of the product is shown in FIG. 13.

[Example 14] Production of Highly Branched Polymer 14 with HDN, STA, and ADVN

Polymerization and purification were performed in the same manner as in Example 1 except that 5.1 g (20 mmol) of HDN as a monomer A and 3.2 g (10 mmol) of STA as a monomer B were used, each amount of toluene was changed to 66 g, and the amount of the hexane/ethanol mixed solution (mass ratio of 1:2) was changed to 305 g, to obtain 1.9 g of a desired product (highly branched polymer 14) as a white powder.

Figure 14:
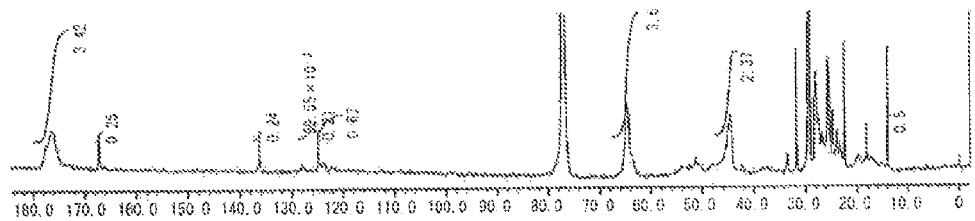
FIG. 14 indicates a $^{13}$C NMR spectrum of a highly branched polymer 14 produced in Example 14.

The weight-average molecular weight Mw of the obtained product measured by GPC in terms of polystyrene was 9,600, and the degree of distribution, Mw/Mn, of the product was 1.8. The $^{13}$C NMR spectrum of the product is shown in FIG. 14.

[Example 15] Production of Highly Branched Polymer 15 with DVB, LA, STA, and ADVN Polymerization and purification were performed in the same manner as in Example 1 except that 3.9 g (30 mmol) of DVB as a monomer A, 3.6 g (15 mmol) of LA and 4.9 g (15 mmol) of STA as monomers B, and 6.0 g (24 mmol) of ADVN as an initiator C were used, each amount of toluene was changed to 78 g, and the amount of the hexane/ethanol mixed solution (mass ratio of 1:2) was changed to 234 g, to obtain 4.1 g of a desired product (highly branched polymer 15) as a white powder.

Figure 15:
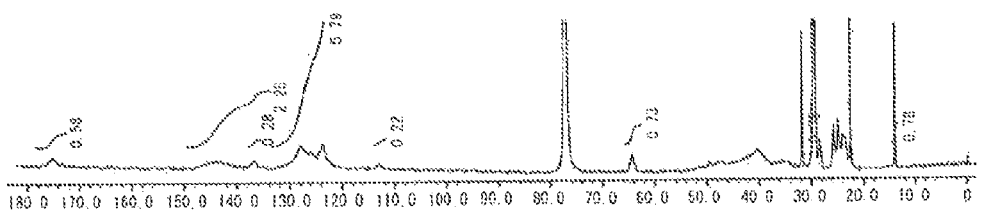
FIG. 15 indicates a $^{13}$C NMR spectrum of a highly branched polymer 15 produced in Example 15.

The weight-average molecular weight Mw of the obtained product measured by GPC in terms of polystyrene was 13,000, and the degree of distribution, Mw/Mn, of the product was 1.6. The $^{13}$C NMR spectrum of the product is shown in FIG. 15.

[Example 16] Production of Highly Branched Polymer 16 with DVB, ISTA, and AMBN

Polymerization and purification were performed in the same manner as in Example 1 except that 3.9 g (30 mmol) of DVB as a monomer A, 4.9 g (15 mmol) of ISTA as a monomer B, and 3.5 g (18 mmol) of AMBN as an initiator C were used, each amount of toluene was changed to 78 g, and the amount of the hexane/ethanol mixed solution (mass ratio of 1:2) was changed to 234 g, to obtain 5.5 g of a desired product (highly branched polymer 16) as a white powder.

Figure 16:
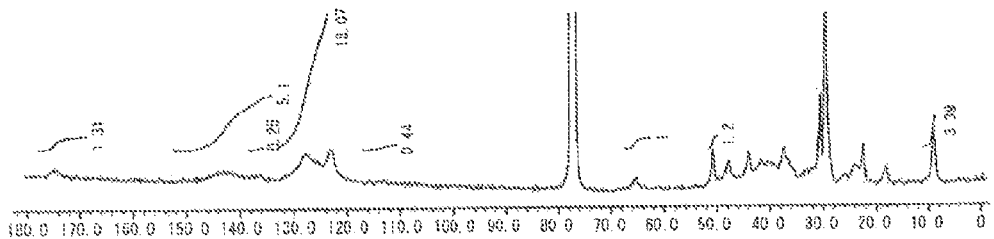
FIG. 16 indicates a $^{13}$C NMR spectrum of a highly branched polymer 16 produced in Example 16.

The weight-average molecular weight Mw of the obtained product measured by GPC in terms of polystyrene was 21,000, and the degree of distribution, Mw/Mn, of the product was 1.8. The $^{13}$C NMR spectrum of the product is shown in FIG. 16.

[Example 51] Production of Highly Branched Polymer 18 with DCP, 4EOL, and ADVN 33 g of toluene was placed in a 200-mL reaction flask, into which nitrogen was flowed for 5 minutes with stirring, followed by heating until reflux of the content (about 110° C.).

In a 100-mL reaction flask, 3.3 g (10 mmol) of DCP as a monomer A, 1.2 g (3 mmol) of 4EOL as a monomer B, 1.5 g (6 mmol) of ADVN as an initiator C, and 33 g of toluene were placed. Nitrogen was flowed thereinto for 5 minutes with stirring to perform replacement with nitrogen.

The content of the 100-mL reaction flask containing DCP, 4EOL, and ADVN was added dropwise to the refluxed toluene in the 200-mL reaction flask with a dropping pump over 30 minutes. After the completion of dropwise addition, stirring continued for another 1 hour.

About 80% (53 g) of the originally placed toluene was then distilled off from the reaction solution with a rotary evaporator, followed by adding the resultant to 166 g of a methanol/water mixed solution (mass ratio of 9:1) to precipitate a polymer. After decantation to remove the supernatant, the residue was dissolved in 13 g of THF, followed by reprecipitation of the solution with 166 g of a methanol/water mixed solution (mass ratio of 9:1) and decantation. After decantation, the residue was redissolved in 13 g of THF, followed by distilling off the solution under reduced pressure and vacuum drying to obtain 2.4 g of a desired product (highly branched polymer 18) as a white powder.

Figure 18:
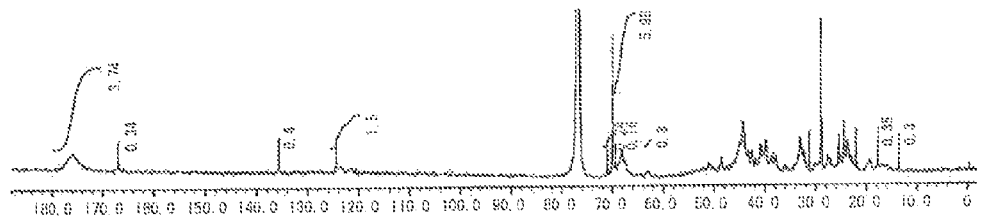
FIG. 18 indicates a $^{13}$C NMR spectrum of a highly branched polymer 18 produced in Example 51.

The weight-average molecular weight Mw of the obtained product measured by GPC in terms of polystyrene was 9,100, and the degree of distribution, Mw/Mn, of the product was 2.9. The $^{13}$C NMR spectrum of the product is shown in FIG. 18.

[Example 52] Production of Highly Branched Polymer 19 with DCP, 4EOL, and ADVN

Polymerization and purification were performed in the same manner as in Example 51 except that the amount of 4EOL was changed to 2.9 g (7 mmol), to obtain 2.3 g of a desired product (highly branched polymer 19) as a white powder.

Figure 19:
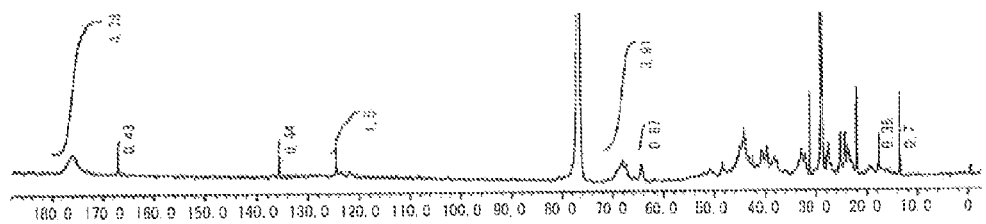
FIG. 19 indicates a $^{13}$C NMR spectrum of a highly branched polymer 19 produced in Example 52.

The weight-average molecular weight Mw of the obtained product measured by GPC in terms of polystyrene was 9,800, and the degree of distribution, Mw/Mn, of the product was 2.1. The $^{13}$C NMR spectrum of the product is shown in FIG. 19.

[Example 53] Production of Highly Branched Polymer 20 with DCP, STA, 4EOL, and ADVN Polymerization and purification were performed in the same manner as in Example 51 except that 1.6 g (5 mmol) of STA and 1.7 g (4 mmol) of 4EOL were used as monomers B and each reprecipitation solvent was changed to 166 g of an ethanol/water mixed solution (mass ratio of 9:1), to obtain 2.8 g of a desired product (highly branched polymer 20) as a white powder.

Figure 20:
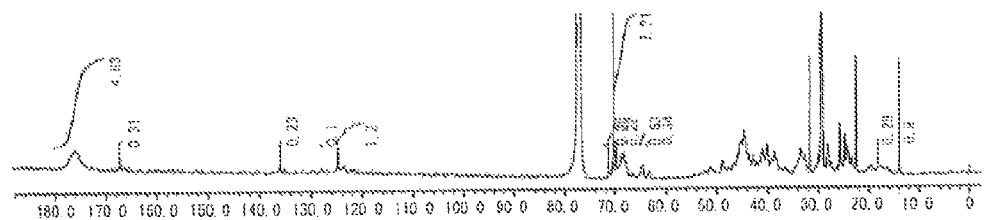
FIG. 20 indicates a $^{13}$C NMR spectrum of a highly branched polymer 20 produced in Example 53.

The weight-average molecular weight Mw of the obtained product measured by GPC in terms of polystyrene was 11,000, and the degree of distribution, Mw/Mn, of the product was 2.4. The $^{13}$C NMR spectrum of the product is shown in FIG. 20.

[Example 54] Production of Highly Branched Polymer 21 with DCP, LA, TMSMA, and ADVN Polymerization and purification were performed in the same manner as in Example 51 except that 1.2 g (5 mmol) of LA was used as a monomer B, 0.5 g (2 mmol) of TMSMA was further added as another monomer along with monomers A and B, each reaction solvent was changed to 57 g of MIBK, and each reprecipitation solvent was changed to 165 g of methanol, to obtain 1.6 g of a desired product (highly branched polymer 21) as a white powder.

Figure 21:
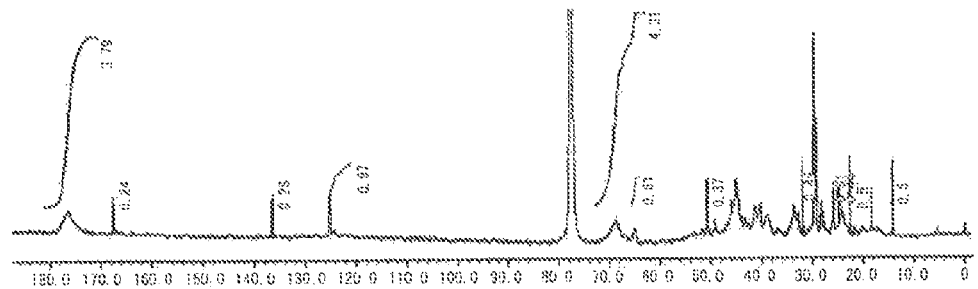
FIG. 21 indicates a $^{13}$C NMR spectrum of a highly branched polymer 21 produced in Example 54.

The weight-average molecular weight Mw of the obtained product measured by GPC in terms of polystyrene was 7,900, and the degree of distribution, Mw/Mn, of the product was 2.3. The $^{13}$C NMR spectrum of the product is shown in FIG. 21.

[Example 55] Production of Highly Branched Polymer 22 with DCP, LA, 4EO, and ADVN Polymerization and purification were performed in the same manner as in Example 51 except that 1.2 g (5 mmol) of LA was used as a monomer B and 1.4 g (5 mmol) of 4EO was further added as another monomer along with monomers A and B, to obtain 0.8 g of a desired product (highly branched polymer 22) as a white powder.

Figure 22:
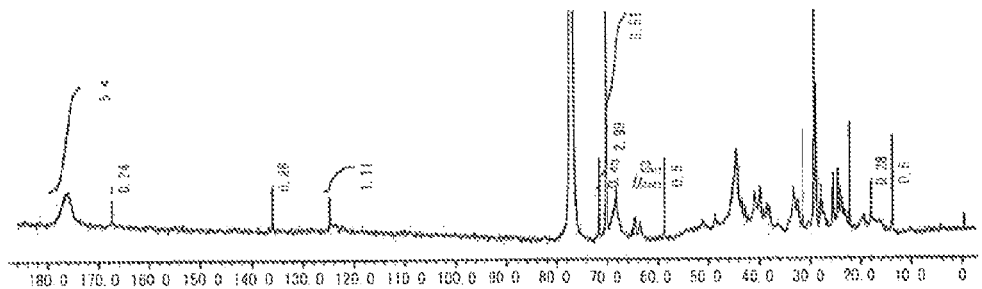
FIG. 22 indicates a $^{13}$C NMR spectrum of a highly branched polymer 22 produced in Example 55.

The weight-average molecular weight Mw of the obtained product measured by GPC in terms of polystyrene was 13,000, and the degree of distribution, Mw/Mn, of the product was 2.1. The $^{13}$C NMR spectrum of the product is shown in FIG. 22.

[Example 56] Production of Highly Branched Polymer 23 with DCP, STA, 9EO, and ADVN Polymerization and purification were performed in the same manner as in Example 51 except that 1.6 g (5 mmol) of STA was used as a monomer B, 1.4 g (3 mmol) of 9EO was further added as another monomer along with monomers A and B, and each reprecipitation solvent was changed to 166 g of an ethanol/water mixed solution (mass ratio of 9:1), to obtain 2.2 g of a desired product (highly branched polymer 23) as a white powder.

Figure 23:
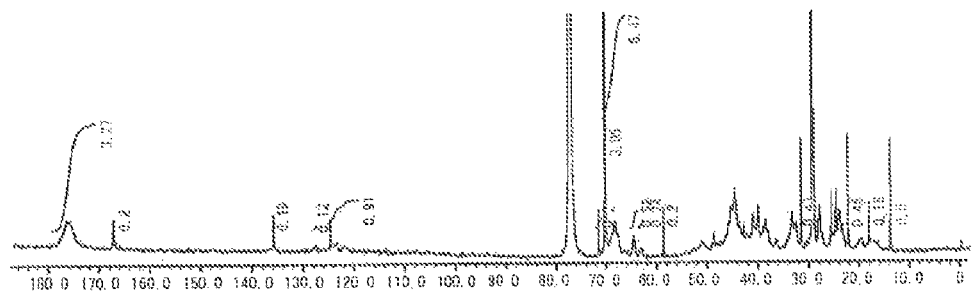
FIG. 23 indicates a $^{13}$C NMR spectrum of a highly branched polymer 23 produced in Example 56.

The weight-average molecular weight Mw of the obtained product measured by GPC in terms of polystyrene was 11,000, and the degree of distribution, Mw/Mn, of the product was 2.3. The $^{13}$C NMR spectrum of the product is shown in FIG. 23.

[Example 57] Production of Highly Branched Polymer 24 with DCP, STA, C1FA, and ADVN Polymerization and purification were performed in the same manner as in Example 1 except that 3.2 g (10 mmol) of STA was used as a monomer B, 0.9 g (6 mmol) of C1FA was further added as another monomer along with monomers A and B, each amount of toluene was changed to 100 g, and each reprecipitation solvent was changed to 332 g of methanol, to obtain 5.0 g of a desired product (highly branched polymer 24) as a white powder.

Figure 24:
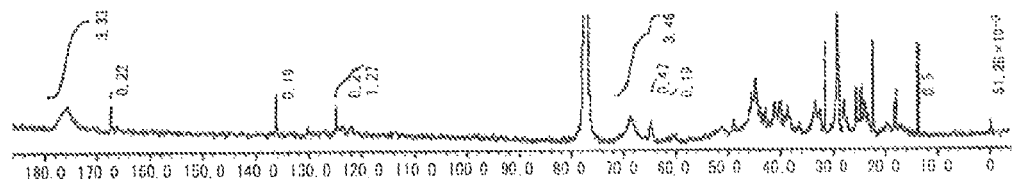
FIG. 24 indicates a $^{13}$C NMR spectrum of a highly branched polymer 24 produced in Example 57.

The weight-average molecular weight Mw of the obtained product measured by GPC in terms of polystyrene was 9,000, and the degree of distribution, Mw/Mn, of the product was 2.7. The $^{13}$C NMR spectrum of the product is shown in FIG. 24.

[Example 58] Production of Highly Branched Polymer 25 with DCP, S164, STA, TMSMA, and ADVN Polymerization and purification were performed in the same manner as in Example 51 except that 2.7 g (8 mmol) of DCP and 0.9 g (2 mmol) of S164 as monomers A and 1.6 g (5 mmol) of STA as a monomer B were used, 0.5 g (2 mmol) of TMSMA was further added as another monomer along with monomers A and B, each reaction solvent was changed to 57 g of MIBK, and each reprecipitation solvent was changed to 177 g of methanol, to obtain 0.5 g of a desired product (highly branched polymer 25) as a white powder.

Figure 25:
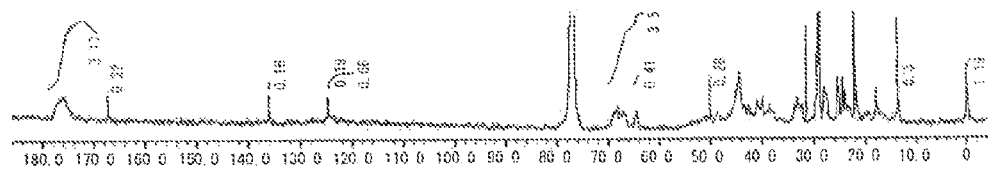
FIG. 25 indicates a $^{13}$C NMR spectrum of a highly branched polymer 25 produced in Example 58.

The weight-average molecular weight Mw of the obtained product measured by GPC in terms of polystyrene was 7,400, and the degree of distribution, Mw/Mn, of the product was 2.3. The $^{13}$C NMR spectrum of the product is shown in FIG. 25.

[Example 59] Production of Highly Branched Polymer 26 with ADCP, STA, and ADVN

Polymerization and purification were performed in the same manner as in Example 1 except that 3.0 g (10 mmol) of ADCP as a monomer A and 0.3 g (1 mmol) of STA as a monomer B were used, the amount of ADVN was changed to 1.7 g (7 mmol), each reaction solvent was changed to 45 g of MIBK, and each reprecipitation solvent was changed to 151 g of methanol, to obtain 2.6 g of a desired product (highly branched polymer 26) as a white powder.

Figure 26:
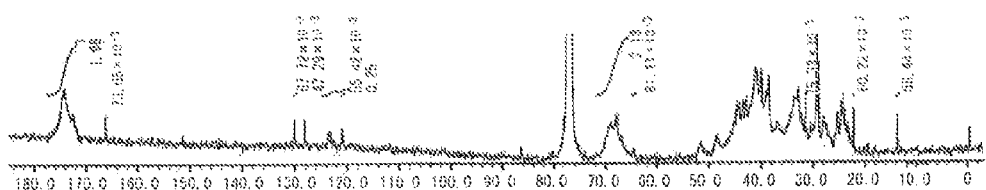
FIG. 26 indicates a $^{13}$C NMR spectrum of a highly branched polymer 26 produced in Example 59.

The weight-average molecular weight Mw of the obtained product measured by GPC in terms of polystyrene was 9,500, and the degree of distribution, Mw/Mn, of the product was 2.7. The $^{13}$C NMR spectrum of the product is shown in FIG. 26.

[Example 60] Production of Highly Branched Polymer 27 with ADCP, STA, and ADVN

Polymerization and purification were performed in the same manner as in Example 1 except that 3.0 g (10 mmol) of ADCP as a monomer A and 1.0 g (3 mmol) of STA as a monomer B were used, the amount of ADVN was changed to 1.7 g (7 mmol), each reaction solvent was changed to 45 g of MIBK, and each reprecipitation solvent was changed to 151 g of methanol, to obtain 2.3 g of a desired product (highly branched polymer 27) as a white powder.

Figure 27:
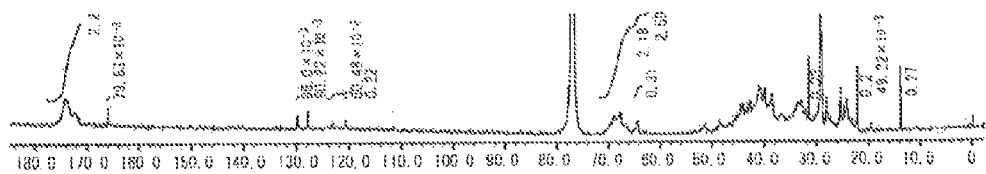
FIG. 27 indicates a $^{13}$C NMR spectrum of a highly branched polymer 27 produced in Example 60.

The weight-average molecular weight Mw of the obtained product measured by GPC in terms of polystyrene was 8,800, and the degree of distribution, Mw/Mn, of the product was 2.5. The $^{13}$C NMR spectrum of the product is shown in FIG. 27.

[Example 61] Production of Highly Branched Polymer 28 with CHA, STA, and ADVN

Polymerization and purification were performed in the same manner as in Example 51 except that 2.5 g (10 mmol) of CHA as a monomer A and 1.6 g (5 mmol) of STA as a monomer B were used, each reaction solvent was changed to 38 g of MIBK, and each reprecipitation solvent was changed to 150 g of a methanol/ethanol mixed solution (mass ratio of 9:1), to obtain 2.5 g of a desired product (highly branched polymer 28) as a white powder.

Figure 28:
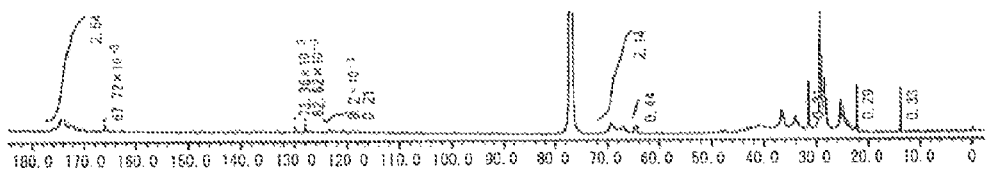
FIG. 28 indicates a $^{13}$C NMR spectrum of a highly branched polymer 28 produced in Example 61.

The weight-average molecular weight Mw of the obtained product measured by GPC in terms of polystyrene was 19,000, and the degree of distribution, Mw/Mn, of the product was 2.6. The $^{13}$C NMR spectrum of the product is shown in FIG. 28.

[Example 62] Production of Highly Branched Polymer 29 with DMA, STA, and ADVN

Polymerization and purification were performed in the same manner as in Example 51 except that 4.0 g (20 mmol) of DMA as a monomer A and 3.2 g (10 mmol) of STA as a monomer B were used, the amount of ADVN was changed to 3.0 g (12 mmol), each reaction solvent was changed to 52 g of MIBK, and each reprecipitation solvent was changed to 198 g of methanol, to obtain 2.8 g of a desired product (highly branched polymer 29) as a white powder.

Figure 29:
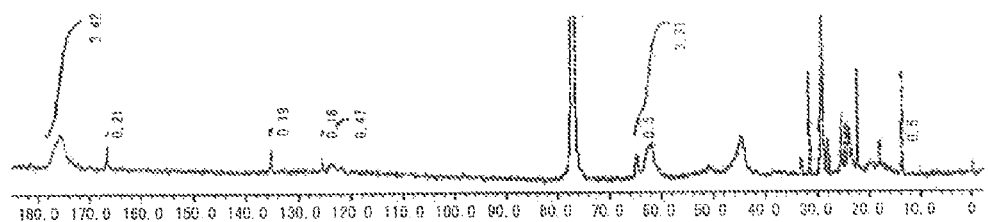
FIG. 29 indicates a $^{13}$C NMR spectrum of a highly branched polymer 29 produced in Example 62.

The weight-average molecular weight Mw of the obtained product measured by GPC in terms of polystyrene was 14,000, and the degree of distribution, Mw/Mn, of the product was 1.9. The $^{13}$C NMR spectrum of the product is shown in FIG. 29.

[Example 63] Production of Highly Branched Polymer 30 with PG, STA, and ADVN

Polymerization and purification were performed in the same manner as in Example 51 except that 2.3 g (10 mmol) of PG as a monomer A and 1.0 g (3 mmol) of STA as a monomer B were used, each reaction solvent was changed to 23 g of MIBK, and each reprecipitation solvent was changed to 114 g of a hexane/ethanol mixed solution (mass ratio of 9:1), to obtain 1.8 g of a desired product (highly branched polymer 30) as a white powder.

Figure 30:
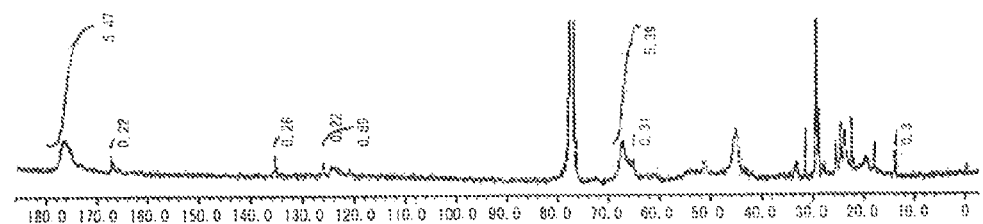
FIG. 30 indicates a $^{13}$C NMR spectrum of a highly branched polymer 30 produced in Example 63.

The weight-average molecular weight Mw of the obtained product measured by GPC in terms of polystyrene was 8,800, and the degree of distribution, Mw/Mn, of the product was 2.8. The $^{13}$C NMR spectrum of the product is shown in FIG. 30.

[Example 64] Production of Highly Branched Polymer 31 with PG, 4EOL, TESMA, and ADVN Polymerization and purification were performed in the same manner as in Example 51 except that 4.6 g (20 mmol) of PG was used as a monomer A, 1.5 g (5 mmol) of TESMA was further added as another monomer along with monomers A and B, the amount of 4EOL was changed to 4.2 g (10 mmol), the amount of ADVN was changed to 3.0 g (12 mmol), each reaction solvent was changed to 50 g of MIBK, and each reprecipitation solvent was changed to 228 g of hexane, to obtain 6.4 g of a desired product (highly branched polymer 31) as a transparent solid.

Figure 31:
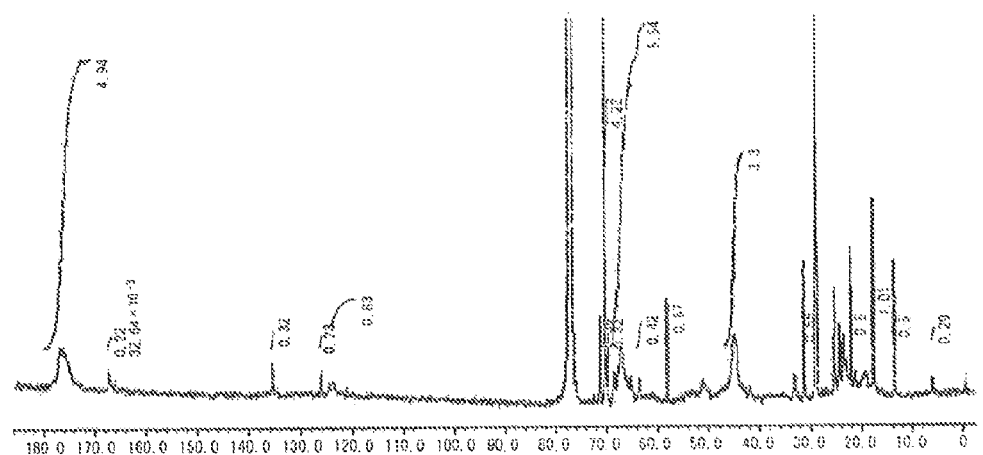
FIG. 31 indicates a $^{13}$C NMR spectrum of a highly branched polymer 31 produced in Example 64.

The weight-average molecular weight Mw of the obtained product measured by GPC in terms of polystyrene was 7,000, and the degree of distribution, Mw/Mn, of the product was 2.9. The $^{13}$C NMR spectrum of the product is shown in FIG. 31.

[Example 65] Production of Highly Branched Polymer 32 with NPG, STA, and ADVN

Polymerization and purification were performed in the same manner as in Example 51 except that 4.8 g (20 mmol) of NPG as a monomer A and 3.2 g (10 mmol) of STA as a monomer B were used, the amount of ADVN was changed to 3.0 g (12 mmol), each reaction solvent was changed to 58 g of MIBK, and each reprecipitation solvent was changed to 240 g of methanol, to obtain 1.0 g of a desired product (highly branched polymer 32) as a white powder.

Figure 32:
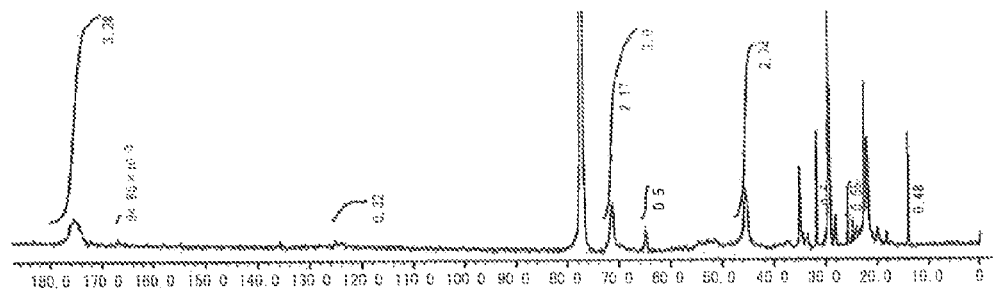
FIG. 32 indicates a $^{13}$C NMR spectrum of a highly branched polymer 32 produced in Example 65.

The weight-average molecular weight Mw of the obtained product measured by GPC in terms of polystyrene was 9,300, and the degree of distribution, Mw/Mn, of the product was 2.0. The $^{13}$C NMR spectrum of the product is shown in FIG. 32.

[Example 66] Production of Highly Branched Polymer 33 with AHDN, STA, and ADVN

Polymerization and purification were performed in the same manner as in Example 51 except that 2.2 g (10 mmol) of AHDN as a monomer A and 1.0 g (3 mmol) of STA as a monomer B were used, the amount of ADVN was changed to 1.2 g (5 mmol), each reaction solvent was changed to 38 g of MIBK, and each reprecipitation solvent was changed to 125 g of methanol, to obtain 0.7 g of a desired product (highly branched polymer 33) as a white powder.

Figure 33:
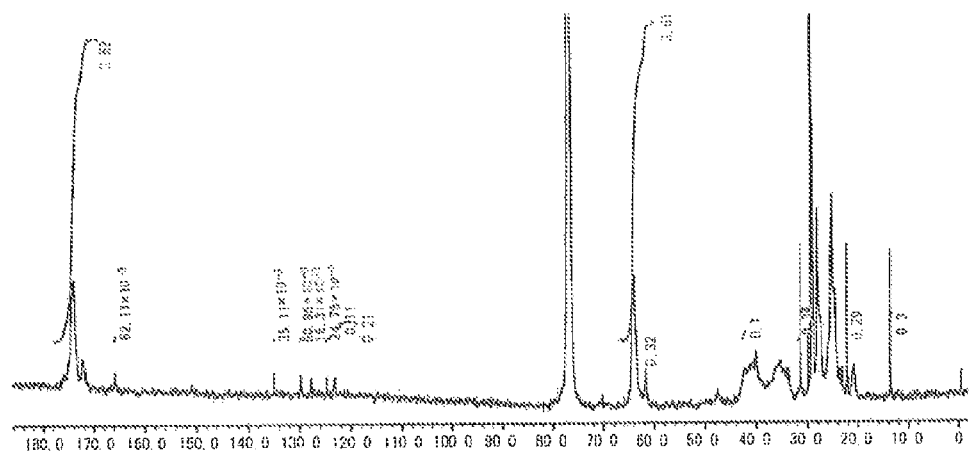
FIG. 33 indicates a $^{13}$C NMR spectrum of a highly branched polymer 33 produced in Example 66.

The weight-average molecular weight Mw of the obtained product measured by GPC in terms of polystyrene was 9,000, and the degree of distribution, Mw/Mn, of the product was 2.2. The $^{13}$C NMR spectrum of the product is shown in FIG. 33.

[Example 67] Production of Highly Branched Polymer 34 with 9DMA, STA, and ADVN

Polymerization and purification were performed in the same manner as in Example 51 except that 5.5 g (10 mmol) of 9DMA as a monomer A and 1.6 g (5 mmol) of STA as a monomer B were used, each amount of toluene was changed to 44 g, and each reprecipitation solvent was changed to 275 g of a hexane/ethanol mixed solution (mass ratio of 9:1), to obtain 4.6 g of a desired product (highly branched polymer 34) as transparent oil.

Figure 34:
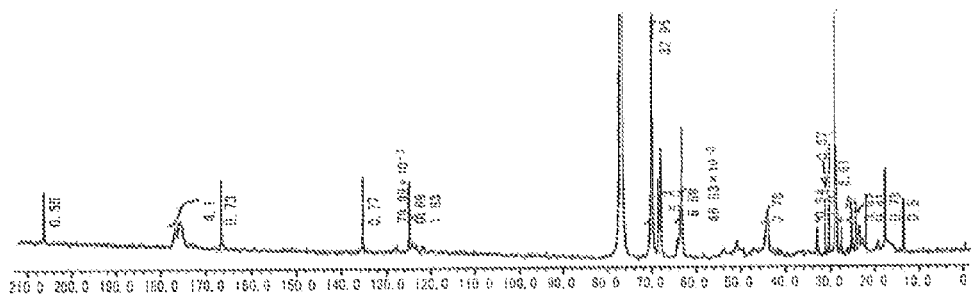
FIG. 34 indicates a $^{13}$C NMR spectrum of a highly branched polymer 34 produced in Example 67.

The weight-average molecular weight Mw of the obtained product measured by GPC in terms of polystyrene was 7,600, and the degree of distribution, Mw/Mn, of the product was 2.5. The $^{13}$C NMR spectrum of the product is shown in FIG. 34.

[Example 68] Production of Highly Branched Polymer 35 with DVB, STA, and ADVN

Polymerization and purification were performed in the same manner as in Example 51 except that 2.6 g (20 mmol) of DVB as a monomer A and 1.9 g (6 mmol) of STA as a monomer B were used, the amount of ADVN was changed to 6.0 g (24 mmol), each reaction solvent was changed to 52 g of MIBK, and each reprecipitation solvent was changed to 130 g of methanol, to obtain 1.9 g of a desired product (highly branched polymer 35) as a white powder.

Figure 35:
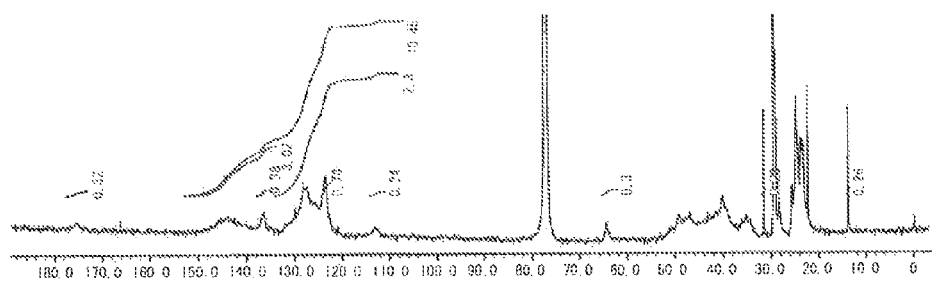
FIG. 35 indicates a $^{13}$C NMR spectrum of a highly branched polymer 35 produced in Example 68.

The weight-average molecular weight Mw of the obtained product measured by GPC in terms of polystyrene was 10,000, and the degree of distribution, Mw/Mn, of the product was 2.1. The $^{13}$C NMR spectrum of the product is shown in FIG. 35.

[Comparative Example 1] Production of Highly Branched Polymer 17 with DCP and ADVN Polymerization and purification were performed in the same manner as in Example 1 except that 2.5 g (10 mmol) of ADVN was used as an initiator C and no monomer B was added, to obtain 4.7 g of a desired product (highly branched polymer 17) as a white powder.

Figure 17:
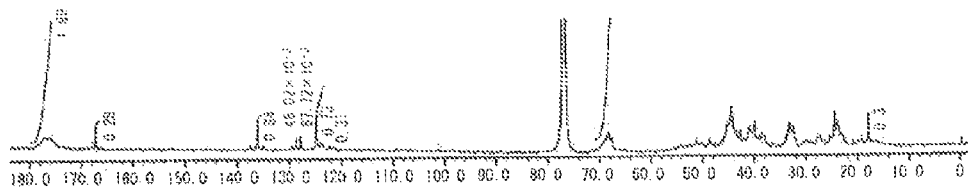
FIG. 17 indicates a $^{13}$C NMR spectrum of a highly branched polymer 17 produced in Comparative Example 1.

The weight-average molecular weight Mw of the obtained product measured by GPC in terms of polystyrene was 14,000, and the degree of distribution, Mw/Mn, of the product was 3.4. The $^{13}$C NMR spectrum of the product is shown in FIG. 17.

As for each of the highly branched polymers 1 to 35 obtained in Examples 1 to 16 and 51 to 68 and Comparative Example 1, Table 1 shows each monomer and the usage [mol %] thereof relative to that of the monomer A, each initiator C and the usage [mol %] thereof relative to that of the monomer A, the weight-average molecular weight as Mw, the degree of distribution as Mw/Mn, and the introduction amounts [mol %] of the monomer B and other monomers calculated from the $^{13}$C NMR spectra.

TABLE 1

| Highly branched polymer | Monomer A | Monomer B Name | Monomer B Usage [mol %] | Other monomers Name | Other monomers Usage [mol %] | Initiator C Name | Initiator C Usage [mol %] | Mw | Mw/Mn | Introduction amount of monomer B [mol %] | Introduction amount of other monomers [mol %] |
|---|---|---|---|---|---|---|---|---|---|---|---|
| 1 | DCP | LA | 50 | — | — | ADVN | 60 | 7,800 | 3.0 | 30 | — |
| 2 | DCP | LA<br>STA | 50<br>50 | — | — | ADVN | 60 | 13,000 | 2.4 | 41 | — |
| 3 | DCP | STA | 50 | — | — | ADVN | 60 | 10,000 | 2.1 | 24 | — |
| 4 | DCP | STA | 100 | — | — | ADVN | 60 | 8,200 | 2.6 | 43 | — |
| 5 | DCP | STA | 50 | TESMA | 50 | ADVN | 60 | 11,000 | 2.0 | 23 | 19 |
| 6 | DCP | ISTA | 50 | — | — | ADVN | 60 | 11,000 | 2.0 | 35 | — |
| 7 | DCP | ISTA | 50 | TESMA | 50 | ADVN | 60 | 13,000 | 2.1 | 25 | 18 |
| 8 | DCP | BA | 50 | — | — | ADVN | 60 | 10,000 | 2.3 | 22 | — |
| 9 | DCP | BA | 50 | — | — | ADVN | 60 | 6,600 | 2.1 | 25 | — |
| 10 | DCP | BA | 100 | — | — | ADVN | 60 | 13,000 | 2.0 | 38 | — |
| 11 | DCP | STA | 50 | — | — | DCHC | 60 | 5,700 | 1.4 | 21 | — |
| 12 | DCP | BA | 50 | — | — | DCHC | 60 | 6,500 | 1.8 | 29 | — |
| 13 | DCP | BA | 100 | — | — | DCHC | 60 | 7,600 | 1.7 | 45 | — |
| 18 | DCP | 4EOL | 30 | — | — | ADVN | 60 | 9,100 | 2.9 | 13 | — |
| 19 | DCP | 4EOL | 70 | — | — | ADVN | 60 | 9,800 | 2.1 | 24 | — |
| 20 | DCP | STA<br>4EOL | 50<br>40 | — | — | ADVN | 60 | 11,000 | 2.4 | 19<br>5 | — |
| 21 | DCP | LA | 50 | TMSMA | 20 | ADVN | 60 | 7,900 | 2.3 | 19 | 6 |
| 22 | DCP | LA | 50 | 4EO | 50 | ADVN | 60 | 13,000 | 2.1 | 18 | 12 |
| 23 | DCP | STA | 50 | 9EO | 30 | ADVN | 60 | 11,000 | 2.3 | 21 | 11 |
| 24 | DCP | STA | 50 | C1FA | 30 | ADVN | 60 | 9,000 | 2.7 | 21 | 11 |
| 25 | DCP<br>S164 | STA | 50 | TMSMA | 20 | ADVN | 60 | 7,400 | 2.3 | 22 | 9 |
| 26 | ADCP | STA | 10 | — | — | ADVN | 70 | 9,500 | 2.7 | 4 | — |
| 27 | ADCP | STA | 30 | — | — | ADVN | 70 | 8,800 | 2.5 | 12 | — |
| 28 | CHA | STA | 50 | — | — | ADVN | 60 | 19,000 | 2.6 | 15 | — |
| 29 | DMA | STA | 50 | — | — | ADVN | 60 | 14,000 | 1.9 | 25 | — |
| 30 | PG | STA | 30 | — | — | ADVN | 60 | 8,800 | 2.8 | 13 | — |
| 31 | PG | 4EOL | 50 | TESMA | 25 | ADVN | 60 | 7,000 | 2.9 | 19 | 6 |
| 32 | NPG | STA | 50 | — | — | ADVN | 60 | 9,300 | 2.0 | 21 | — |
| 14 | HDN | STA | 50 | — | — | ADVN | 60 | 9,600 | 1.8 | 21 | — |
| 33 | AHDN | STA | 30 | — | — | ADVN | 50 | 9,000 | 2.2 | 15 | — |
| 34 | 9DMA | STA | 50 | — | — | ADVN | 60 | 7,600 | 2.5 | 19 | — |
| 35 | DVB | STA | 30 | — | — | ADVN | 120 | 10,000 | 2.1 | 13 | — |
| 15 | DVB | LA<br>STA | 50<br>50 | — | — | ADVN | 80 | 13,000 | 1.6 | 30 | — |
| 16 | DVB | ISTA | 50 | — | — | AMBN | 60 | 21,000 | 1.8 | 25 | — |
| 17 | DCP | — | — | — | — | ADVN | 50 | 14,000 | 3.4 | — | — |

*Reference (Each of the filled circles is a (meth)acryloyl group.)

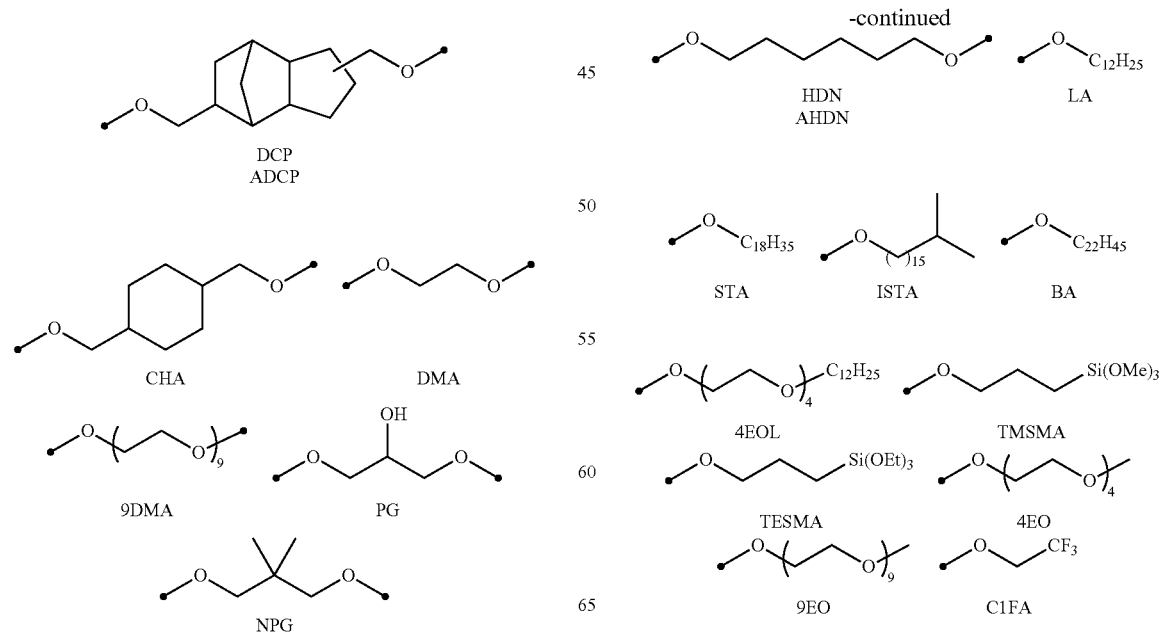

[Example 17] Solvent Solubility of Highly Branched Polymers 1 to 16 and 18 to 35

The solubility of each of the highly branched polymers 1 to 16 and 18 to 35 obtained in Examples 1 to 16 and 51 to 68 in each solvent in Table 2 was evaluated. The highly branched polymer was mixed with the solvent at a concentration of 10% by mass, and the resultant mixture was stirred at 25° C. for 1 minute, followed by visual observation based on the criteria below for evaluation. Results are shown in Table 2 as well.

[Evaluation Criteria]
○: Dissolved well to give transparent solution
×: Partly undissolved

[Comparative Example 2] Solvent Solubility of Highly Branched Polymer 17

Evaluation was performed for the highly branched polymer 17 obtained in Comparative Example 1, in the same manner as in Example 17. Results are shown in Table 2 as well.

TABLE 2

| | Toluene | Acetone | MIBK | THF | AcOBu | Water |
|---|---|---|---|---|---|---|
| Highly branched polymer 1 | ○ | × | ○ | ○ | ○ | × |
| Highly branched polymer 2 | ○ | × | ○ | ○ | ○ | × |
| Highly branched polymer 3 | ○ | × | ○ | ○ | ○ | × |
| Highly branched polymer 4 | ○ | × | ○ | ○ | ○ | × |
| Highly branched polymer 5 | ○ | × | ○ | ○ | ○ | × |
| Highly branched polymer 6 | ○ | × | ○ | ○ | ○ | × |
| Highly branched polymer 7 | ○ | × | ○ | ○ | ○ | × |
| Highly branched polymer 8 | ○ | × | ○ | ○ | ○ | × |
| Highly branched polymer 9 | ○ | × | ○ | ○ | ○ | × |
| Highly branched polymer 10 | ○ | × | ○ | ○ | ○ | × |
| Highly branched polymer 11 | ○ | × | ○ | ○ | ○ | × |
| Highly branched polymer 12 | ○ | × | ○ | ○ | ○ | × |
| Highly branched polymer 13 | ○ | × | ○ | ○ | ○ | × |
| Highly branched polymer 14 | ○ | ○ | ○ | ○ | ○ | × |
| Highly branched polymer 15 | ○ | × | ○ | ○ | ○ | × |
| Highly branched polymer 16 | ○ | × | ○ | ○ | ○ | × |
| Highly branched polymer 18 | ○ | ○ | ○ | ○ | ○ | × |
| Highly branched polymer 19 | ○ | × | ○ | ○ | ○ | × |
| Highly branched polymer 20 | ○ | × | ○ | ○ | ○ | × |
| Highly branched polymer 21 | ○ | × | ○ | ○ | ○ | × |
| Highly branched polymer 22 | ○ | ○ | ○ | ○ | ○ | × |
| Highly branched polymer 23 | ○ | ○ | ○ | ○ | ○ | × |
| Highly branched polymer 24 | ○ | × | ○ | ○ | ○ | × |
| Highly branched polymer 25 | ○ | × | ○ | ○ | ○ | × |
| Highly branched polymer 26 | ○ | × | ○ | ○ | ○ | × |
| Highly branched polymer 27 | ○ | × | ○ | ○ | ○ | × |
| Highly branched polymer 28 | ○ | ○ | ○ | ○ | ○ | × |
| Highly branched polymer 29 | ○ | × | ○ | ○ | ○ | × |
| Highly branched polymer 30 | × | ○ | ○ | ○ | ○ | × |
| Highly branched polymer 31 | ○ | ○ | ○ | ○ | ○ | × |
| Highly branched polymer 32 | ○ | ○ | ○ | ○ | ○ | × |
| Highly branched polymer 33 | ○ | ○ | ○ | ○ | ○ | × |
| Highly branched polymer 34 | ○ | ○ | ○ | ○ | ○ | × |
| Highly branched polymer 35 | ○ | ○ | ○ | ○ | ○ | × |
| Highly branched polymer 17 | ○ | × | ○ | ○ | ○ | × |

[Example 18] Preparation and Physical Property Evaluation of Single Thin Film of Each of Highly Branched Polymers 1 to 16 and 18 to 35

A solution of each of the highly branched polymers 1 to 16 and 18 to 35 obtained in Examples 1 to 16 and 51 to 68 in toluene of a concentration of 5% by mass was prepared, followed by filter filtration to prepare a varnish containing the highly branched polymer. A silicon wafer was spin coated (slope: 5 seconds, 1,500 rpm×30 seconds, slope: 5 seconds) with the varnish, and heat treatment was performed for 30 minutes at 100° C. to remove the solvent, thereby forming a film.

The refractive index of the obtained thin film at a wavelength of 633 nm, and the contact angle with each of water and diiodomethane were evaluated. From the contact angle results, surface energy was calculated. The glass transition temperature (Tg) and the 5% weight loss temperature ($Td_{5\%}$) of the powder of each highly branched polymer were also measured. The results obtained are shown in Table 3 as well.

[Comparative Example 3] Preparation and Physical Property Evaluation of Single Thin Film of Highly Branched Polymer 17

A thin film of the highly branched polymer 17 obtained in Comparative Example 1 was prepared and evaluated in the same manner as in Example 18. Results are shown in Table 3 as well.

TABLE 3

| | Tg [° C.] | Td$_{5\%}$ [° C.] | Film thickness (nm) | Refractive index (633 nm) | Contact angle [degree] H$_2$O | Contact angle [degree] CH$_2$I$_2$ | Surface energy [mJ/m$^2$] |
|---|---|---|---|---|---|---|---|
| Highly branched polymer 1 | 63.5 | 283.4 | 240 | 1.517 | 91.5 | 15.3 | 49.6 |
| Highly branched polymer 2 | 52.8 | 301.4 | 241 | 1.520 | 91.9 | 30.4 | 44.3 |
| Highly branched polymer 3 | 67.2 | 296.1 | 253 | 1.516 | 89.8 | 25.5 | 46.1 |
| Highly branched polymer 4 | 70.2 | 295.8 | 250 | 1.509 | 92.8 | 28.3 | 45.4 |
| Highly branched polymer 5 | 62.2 | 302.6 | 232 | 1.509 | 84.1 | 28.6 | 44.9 |
| Highly branched polymer 6 | 74.2 | 287.9 | 309 | 1.512 | 92.3 | 40.0 | 39.7 |
| Highly branched polymer 7 | 69.5 | 295.9 | 242 | 1.507 | 91.2 | 37.7 | 40.8 |
| Highly branched polymer 8 | 61.9 | 294.2 | 242 | 1.521 | 91.3 | 26.0 | 46.1 |
| Highly branched polymer 9 | 59.9 | 298.2 | 234 | 1.512 | 94.1 | 30.6 | 44.5 |
| Highly branched polymer 10 | 54.3 | 299.8 | 269 | 1.508 | 94.0 | 39.6 | 40.0 |
| Highly branched polymer 11 | 44.2 | 295.6 | 239 | 1.517 | 89.4 | 26.2 | 45.8 |
| Highly branched polymer 12 | 36.1 | 296.4 | 238 | 1.516 | 89.4 | 26.8 | 45.6 |
| Highly branched polymer 13 | 48.3 | 294.0 | 255 | 1.521 | 107.5 | 37.2 | 44.2 |
| Highly branched polymer 14 | 69.0 | 266.3 | 235 | 1.498 | 83.5 | 25.7 | 46.0 |
| Highly branched polymer 15 | 67.7 | 333.6 | 252 | 1.526 | 94.3 | 40.4 | 39.7 |
| Highly branched polymer 16 | 73.2 | 359.0 | 305 | 1.529 | 90.9 | 45.0 | 37.0 |
| Highly branched polymer 18 | 64.8 | 286.2 | 225 | 1.517 | 78.2 | 9.5 | 50.4 |
| Highly branched polymer 19 | 55.2 | 296.2 | 241 | 1.513 | 83.2 | 15.7 | 48.9 |
| Highly branched polymer 20 | 43.0 | 295.7 | 204 | 1.513 | 85.1 | 26.3 | 45.7 |
| Highly branched polymer 21 | 42.9 | 301.1 | 253 | 1.520 | 79.4 | 19.2 | 48.3 |
| Highly branched polymer 22 | 58.3 | 291.1 | 233 | 1.513 | 81.3 | 17.2 | 48.6 |
| Highly branched polymer 23 | 47.4 | 299.2 | 211 | 1.516 | 87.9 | 20.1 | 47.8 |
| Highly branched polymer 24 | 68.5 | 302.3 | 243 | 1.511 | 84.0 | 28.4 | 44.9 |
| Highly branched polymer 25 | 55.8 | 292.2 | 256 | 1.508 | 78.4 | 27.4 | 45.9 |
| Highly branched polymer 26 | 72.6 | 336.6 | 229 | 1.520 | 78.1 | 14.1 | 49.6 |
| Highly branched polymer 27 | 71.9 | 336.7 | 228 | 1.520 | 82.0 | 14.2 | 49.3 |
| Highly branched polymer 28 | 54.0 | 320.6 | 241 | 1.505 | 87.4 | 25.5 | 46.0 |
| Highly branched polymer 29 | 62.1 | 282.1 | 244 | 1.499 | 87.3 | 44.4 | 37.5 |
| Highly branched polymer 30 | 69.6 | 253.3 | 108 | 1.503 | 83.5 | 44.5 | 38.0 |
| Highly branched polymer 31 | 85.3 | 262.6 | 223 | 1.499 | 80.6 | 43.5 | 40.9 |
| Highly branched polymer 32 | 56.6 | 273.2 | 256 | 1.499 | 81.7 | 32.0 | 43.7 |
| Highly branched polymer 33 | 57.5 | 313.6 | 266 | 1.505 | 86.9 | 20.4 | 47.7 |
| Highly branched polymer 34 | None | 230.0 | 217 | 1.491 | 91.4 | 37.7 | 40.8 |
| Highly branched polymer 35 | 88.5 | 333.9 | 256 | 1.538 | 88.2 | 39.2 | 40.1 |
| Highly branched polymer 17 | 71.2 | 266.8 | 228 | 1.517 | 82.1 | 14.6 | 49.2 |

[Examples 19 to 34 and 69 to 83] Surface Modification of Photo-Curing Acrylic Resin Containing Highly Branched Polymer In an acrylic photopolymerizable compound (monomer) DPHA, each surface modifier in Table 4, 1 part by mass of a photopolymerization initiator Irg. 907 relative to 100 parts by mass of solid matter (DPHA and the surface modifier, the same applies hereinafter), and butyl acetate were mixed to prepare a photopolymerizable composition having the predetermined surface modifier concentration in solid matter (the proportion of the mass of the surface modifier to the total mass of the solid matter) and the predetermined solid content concentration in varnish (the proportion of the mass of the solid matter to the total mass of the solid matter and butyl acetate). In Example 19, for example, 4.95 g of DPHA, 0.05 g of the highly branched polymer 1, 0.05 g of Irg. 907, and 5.00 g of butyl acetate were mixed.

Filter filtration of the composition was performed, followed by spin coating (slope: 5 seconds, 500 rpm×30 seconds, slope: 5 seconds) onto a glass substrate to obtain a coating. The coating was heated at 60° C. for 1 minute for pre-drying, and then exposure was performed by irradiating the entire coating with UV light at an intensity of 20 mW/cm$^2$ for 10 minutes, followed by another heat treatment at 100° C. for 10 minutes to prepare a photo-cured film.

The total light transmittance, the HAZE, and the water and oleic acid contact angles of the resulting photo-cured film were measured. The oleic acid contact angle was measured 10 seconds and 1 minute after adding oleic acid dropwise to a film to be evaluated. Results are shown in Table 4 as well.

[Comparative Example 4] Physical Properties of Photo-Cured Acrylic Resin Film Including No Surface Modifier Procedures and evaluation were performed in the same manner as in Example 19 except that no surface modifier was added. Results are shown in Table 4 as well.

[Comparative Example 5] Surface Modification of Photo-Curing Acrylic Resin with General-Purpose Lipophilic Surface Modifier Procedures and evaluation were performed in the same manner as in Example 19 except that commercially available ZX was used as a surface modifier. Results are shown in Table 4 as well.

[Comparative Example 6] Surface Modification of Photo-Curing Acrylic Resin with Highly Branched Polymer Including No Monomer B Segment Procedures and evaluation were performed in the same manner as in Example 19 except that the highly branched polymer 17 was used as a surface modifier. Results are shown in Table 4 as well.

TABLE 4

| | Surface modifier | Surface modifier concentration in solid matter [% by mass] | Solid content concentration in varnish [% by mass] | Total light transmittance [%] | HAZE | Contact angle [degree] | | |
|---|---|---|---|---|---|---|---|---|
| | | | | | | H₂O | Oleic acid After 10 sec. | Oleic acid After 1 min. |
| Example 19 | Highly branched polymer 1 | 1.0 | 50 | 100.0 | 0.06 | 85.0 | 14.7 | 10.1 |
| Example 20 | Highly branched polymer 2 | 1.0 | 50 | 99.9 | 0.00 | 86.8 | 10.3 | 6.3 |
| Example 21 | Highly branched polymer 2 | 3.0 | 50 | 99.8 | 2.59 | 87.9 | 9.8 | 5.0 |
| Example 22 | Highly branched polymer 3 | 1.0 | 50 | 100.0 | 0.08 | 85.4 | 13.3 | 9.4 |
| Example 23 | Highly branched polymer 3 | 3.0 | 50 | 100.0 | 0.59 | 77.6 | 10.9 | 6.5 |
| Example 24 | Highly branched polymer 3 | 3.0 | 25 | 100.0 | 0.13 | 84.5 | 9.2 | 5.1 |
| Example 25 | Highly branched polymer 4 | 1.0 | 50 | 100.0 | 0.04 | 86.0 | 17.6 | 11.3 |
| Example 26 | Highly branched polymer 5 | 1.0 | 50 | 99.7 | 0.11 | 83.7 | 13.8 | 7.6 |
| Example 27 | Highly branched polymer 5 | 3.0 | 50 | 99.9 | 0.98 | 82.8 | 10.0 | 4.9 |
| Example 28 | Highly branched polymer 8 | 1.0 | 50 | 99.9 | 0.27 | 86.8 | 10.1 | 5.8 |
| Example 29 | Highly branched polymer 9 | 1.0 | 50 | 99.9 | 0.00 | 84.4 | 15.3 | 9.3 |
| Example 30 | Highly branched polymer 11 | 1.0 | 50 | 100.0 | 0.01 | 85.4 | 12.9 | 6.8 |
| Example 31 | Highly branched polymer 11 | 3.0 | 50 | 99.6 | 0.97 | 84.4 | 9.6 | 4.5 |
| Example 32 | Highly branched polymer 12 | 1.0 | 50 | 100.0 | 0.01 | 84.6 | 13.7 | 8.8 |
| Example 33 | Highly branched polymer 14 | 1.0 | 50 | 99.9 | 0.32 | 84.3 | 10.3 | 5.0 |
| Example 34 | Highly branched polymer 15 | 1.0 | 50 | 99.9 | 0.18 | 83.6 | 12.4 | 10.9 |
| Example 69 | Highly branched polymer 18 | 1.0 | 40 | 100.0 | 0.04 | 77.5 | 10.4 | 7.0 |
| Example 70 | Highly branched polymer 19 | 1.0 | 40 | 100.0 | 0.23 | 89.5 | 12.4 | 7.6 |
| Example 71 | Highly branched polymer 20 | 1.0 | 40 | 99.7 | 0.16 | 86.4 | 13.0 | 8.4 |
| Example 72 | Highly branched polymer 21 | 1.0 | 40 | 99.7 | 0.21 | 84.9 | 14.2 | 12.7 |
| Example 73 | Highly branched polymer 22 | 1.0 | 40 | 100.0 | 0.15 | 78.1 | 12.0 | 7.8 |
| Example 74 | Highly branched polymer 23 | 1.0 | 40 | 99.7 | 0.12 | 88.5 | 11.1 | 6.8 |
| Example 75 | Highly branched polymer 24 | 1.0 | 40 | 99.8 | 0.38 | 100.0 | 13.6 | 7.6 |
| Example 76 | Highly branched polymer 25 | 1.0 | 40 | 99.7 | 0.29 | 89.5 | 15.7 | 11.0 |
| Example 77 | Highly branched polymer 26 | 1.0 | 40 | 100.0 | 0.13 | 81.3 | 12.6 | 8.7 |
| Example 78 | Highly branched polymer 27 | 1.0 | 40 | 100.0 | 0.22 | 89.9 | 12.8 | 8.6 |
| Example 79 | Highly branched polymer 28 | 1.0 | 40 | 100.0 | 0.38 | 88.3 | 17.1 | 11.4 |
| Example 80 | Highly branched polymer 32 | 1.0 | 40 | 100.0 | 0.36 | 96.0 | 13.8 | 9.8 |
| Example 81 | Highly branched polymer 33 | 1.0 | 40 | 100.0 | 0.06 | 87.0 | 11.7 | 8.2 |
| Example 82 | Highly branched polymer 34 | 1.0 | 40 | 99.7 | 0.13 | 68.1 | 14.2 | 7.1 |
| Example 83 | Highly branched polymer 35 | 1.0 | 40 | 100.0 | 0.11 | 86.8 | 11.6 | 8.8 |
| Comparative Example 4 | — | — | 50 | 99.9 | 0.16 | 62.5 | 20.8 | 18.2 |
| Comparative Example 5 | ZX | 1.0 | 50 | 100.0 | 0.06 | 86.8 | 15.5 | 12.9 |
| Comparative Example 6 | Highly branched polymer 17 | 1.0 | 50 | 100.0 | 0.01 | 69.1 | 19.4 | 18.5 |

As the results in Table 4 shows, the oleic acid contact angle of the photo-cured acrylic film including no surface modifier was 20.8 degrees after 10 seconds and 18.2 degrees after 1 minute (Comparative Example 4). In contrast to this, the photo-cured acrylic films that included the lipophilic polymers of the present invention as a surface modifier had oleic acid contact angles of as small as 9.2 to 17.6 degrees after 10 seconds and 4.5 to 12.7 degrees after 1 minute (Examples 19 to 34 and 69 to 83). In addition, the oleic acid contact angles (after 10 seconds and 1 minute) of the photo-cured acrylic films including the lipophilic polymers of the present invention were significantly smaller than the oleic acid contact angle of the photo-cured acrylic film including commercially available ZX as a surface modifier (Comparative Example 5).

As shown in these results, when added to a resin composition, the highly branched lipophilic polymer of the present invention can give lipophilicity (anti-fingerprint property) to a film resulted from curing of the resin composition without impairing the intrinsic transparency of the resin. Besides, the highly branched lipophilic polymer of the present invention can give significantly high lipophilicity to a cured film compared to a conventional surface modifier.

[Examples 35 to 50] Surface Modification of Urethane Acrylate Photo-Curing Resin with Highly Branched Polymers 3 and 11

4.95 g of a urethane acrylate photopolymerizable compound (monomer) in Table 5, 0.05 g of a surface modifier in Table 5, 0.05 g of a photopolymerization initiator Irg. 907, and 15.00 g of MIBK were mixed to prepare a photopolymerizable composition.

Filter filtration of the composition was performed, followed by spin coating (slope: 5 seconds, 500 rpm×30 seconds, slope: 5 seconds) onto a glass substrate to obtain a coating. The coating was heated at 80° C. for 1 minute for pre-drying, and then exposure was performed by irradiating the entire coating with UV light at an intensity of 20 mW/cm² for 3 minutes to prepare a photo-cured film.

The total light transmittance, the HAZE, and the water and oleic acid contact angles of the obtained photo-cured film were measured. The oleic acid contact angle was measured 10 seconds and 1 minute after adding oleic acid dropwise to a film to be evaluated. Results are shown in Table 5 as well.

[Comparative Examples 7 to 14] Physical Properties of Urethane Acrylate Photo-Cured Resin Film Including No Surface Modifier Procedures and evaluation were performed in the same manner as in Example 35 except that the amount of the urethane acrylate photopolymerizable compound (monomer) was changed to 5.00 g and no surface modifier was added. Results are shown in Table 5 as well.

TABLE 5

| | Surface modifier | Urethane/ acrylic monomer | Total light transmittance [%] | HAZE | Contact angle [degree] H$_2$O | Oleic acid After 10 sec. | After 1 min. |
|---|---|---|---|---|---|---|---|
| Example 35 | Highly branched polymer 3 | BS575 | 99.9 | 0.00 | 81.4 | 11.6 | 6.9 |
| Example 36 | Highly branched polymer 11 | BS575 | 99.9 | 0.16 | 79.9 | 9.2 | 5.6 |
| Comparative Example 7 | — | BS575 | 100.0 | 0.02 | 72.9 | 10.5 | 9.4 |
| Example 37 | Highly branched polymer 3 | UA306H | 99.9 | 0.00 | 81.0 | 10.0 | 5.9 |
| Example 38 | Highly branched polymer 11 | UA306H | 100.0 | 0.00 | 85.7 | 9.5 | 5.6 |
| Comparative Example 8 | — | UA306H | 100.0 | 0.22 | 62.6 | 12.5 | 12.0 |
| Example 39 | Highly branched polymer 3 | UA306I | 100.0 | 0.05 | 89.9 | 12.5 | 8.0 |
| Example 40 | Highly branched polymer 11 | UA306I | 100.0 | 0.00 | 81.9 | 10.2 | 5.8 |
| Comparative Example 9 | — | UA306I | 99.9 | 0.08 | 66.4 | 11.9 | 11.3 |
| Example 41 | Highly branched polymer 3 | UA306T | 99.7 | 0.03 | 84.2 | 10.6 | 6.7 |
| Example 42 | Highly branched polymer 11 | UA306T | 99.8 | 0.00 | 82.1 | 9.5 | 5.1 |
| Comparative Example 10 | — | UA306T | 99.7 | 0.00 | 68.6 | 19.1 | 18.7 |
| Example 43 | Highly branched polymer 3 | UV1700 | 100.0 | 0.05 | 85.5 | 10.4 | 6.2 |
| Example 44 | Highly branched polymer 11 | UV1700 | 99.8 | 0.00 | 78.2 | 9.7 | 8.9 |
| Comparative Example 11 | — | UV1700 | 100.0 | 0.33 | 64.6 | 12.3 | 11.2 |
| Example 45 | Highly branched polymer 3 | UV6300 | 99.7 | 0.06 | 78.1 | 10.6 | 6.3 |
| Example 46 | Highly branched polymer 11 | UV6300 | 100.0 | 0.00 | 86.9 | 10.4 | 5.4 |
| Comparative Example 12 | — | UV6300 | 100.0 | 0.24 | 67.5 | 12.9 | 11.6 |
| Example 47 | Highly branched polymer 3 | UV7600 | 99.9 | 0.00 | 81.5 | 10.5 | 6.2 |
| Example 48 | Highly branched polymer 11 | UV7600 | 100.0 | 0.19 | 80.4 | 10.2 | 7.2 |
| Comparative Example 13 | — | UV7600 | 100.0 | 0.07 | 73.5 | 10.6 | 16.4 |
| Example 49 | Highly branched polymer 3 | UV7605 | 99.9 | 0.00 | 83.9 | 10.5 | 6.1 |
| Example 50 | Highly branched polymer 11 | UV7605 | 100.0 | 0.00 | 83.3 | 9.7 | 5.5 |
| Comparative Example 14 | — | UV7605 | 100.0 | 0.05 | 62.7 | 11.1 | 10.6 |

As shown in Table 5, the highly branched lipophilic polymer of the present invention can give lipophilicity (anti-fingerprint property) to various urethane acrylate photo-cured films without impairing the intrinsic transparency of the resin.

The invention claimed is:

1. A photopolymerizable composition comprising a highly branched lipophilic polymer (a), a photopolymerizable compound (b), and a photopolymerization initiator (c),
   wherein the highly branched lipophilic polymer (a) is obtained by polymerizing (i) a monomer A containing two or more radically polymerizable double bonds per molecule, (ii) a monomer B containing an unsubstituted C$_{6-30}$ alkyl group or an unsubstituted C$_{3-30}$ alicyclic group and at least one radically polymerizable double bond per molecule, and optionally (iii) a monomer D that is different from the monomer A and the monomer B, in the presence of 5 to 200 mol % of a polymerization initiator C relative to the number of moles of the monomer A.

2. The photopolymerizable composition according to claim 1, wherein a content of the highly branched lipophilic polymer (a) is 0.01 to 20 parts by mass relative to 100 parts by mass of the photopolymerizable compound (b).

3. The photopolymerizable composition according to claim 2, wherein the photopolymerizable compound (b) is a multifunctional (meth)acrylate compound.

4. The photopolymerizable composition according to claim 3, wherein the photopolymerizable compound (b) is dipentaerythritol hexa(meth)acrylate.

5. A resin shaped product prepared by photopolymerization of the photopolymerizable composition as claimed in claim 1.

6. The photopolymerizable composition according to claim 1, wherein the monomer A is a compound containing either or both of a vinyl group and a (meth)acrylic group.

7. The photopolymerizable composition according to claim 6, wherein the monomer A is a divinyl compound or a di(meth)acrylate compound.

8. The photopolymerizable composition according to claim 7, wherein the monomer A is a compound containing a $C_{3-30}$ alicyclic group.

9. The photopolymerizable composition according to claim 8, wherein the monomer A is tricyclo[$5.2.1.0^{2,6}$] decane dimethanol di(meth)acrylate.

10. The photopolymerizable composition according to claim 7, wherein the monomer A is a compound of Formula [1]:

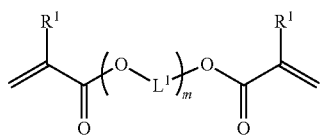

[1]

(where $R^1$ is a hydrogen atom or a methyl group; $L^1$ is a $C_{2-12}$ alkylene group that is optionally substituted with a hydroxy group; and m is an integer of 1 to 30).

11. The photopolymerizable composition according to claim 10, wherein $L^1$ is an ethylene group.

12. The photopolymerizable composition according to claim 1, wherein the highly branched lipophilic polymer is obtained using 5 to 300 mol % of the monomer B relative to the number of moles of the monomer A.

13. The photopolymerizable composition according to claim 12, wherein the monomer B is a compound of Formula [2]:

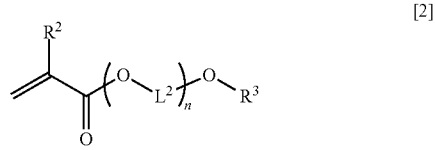

[2]

(where $R^2$ is a hydrogen atom or a methyl group; $R^3$ is a $C_{6-30}$ alkyl group or a $C_{3-30}$ alicyclic group; $L^2$ is a $C_{2-6}$ alkylene group; and n is an integer of 0 to 30).

14. The photopolymerizable composition according to claim 13, wherein n is 0.

15. The photopolymerizable composition according to claim 13, wherein $L^2$ is an ethylene group.

16. The photopolymerizable composition according to claim 1, wherein the polymerization initiator C is an azo polymerization initiator.

17. The photopolymerizable composition according to claim 16, wherein the polymerization initiator C is 2,2'-azobis(2,4-dimethylvaleronitrile).

18. The photopolymerizable composition according to claim 16, wherein the polymerization initiator C is dimethyl 1,1'-azobis(1-cyclohexanecarboxylate).

* * * * *